United States Patent
Neville et al.

(10) Patent No.: US 9,195,413 B2
(45) Date of Patent: Nov. 24, 2015

(54) NETWORKED PRINTING SYSTEMS

(71) Applicant: Xerox International Partners, Palo Alto, CA (US)

(72) Inventors: Russell Neville, Tualatin, OR (US); Jing Qing Song, Saratoga, CA (US); Ashok Murthy, Union City, CA (US); Hiroyuki Hirai, Sunnyvale, CA (US); Reza Majidansari, San Jose, CA (US); Shoji Fukushima, Mountain View, CA (US); Shinichiro Fukunaga, Sunnyvale, CA (US)

(73) Assignee: Xerox International Partners, Palo Alto, CA (US)

( * ) Notice: Subject to any disclaimer, the term of this patent is extended or adjusted under 35 U.S.C. 154(b) by 279 days.

(21) Appl. No.: 13/673,758

(22) Filed: Nov. 9, 2012

(65) Prior Publication Data

US 2014/0132982 A1    May 15, 2014

(51) Int. Cl.
*G06F 3/12*    (2006.01)
*H04N 1/00*    (2006.01)

(52) U.S. Cl.
CPC .............. *G06F 3/1204* (2013.01); *G06F 3/126* (2013.01); *G06F 3/1226* (2013.01); *G06F 3/1288* (2013.01); *G06F 3/1292* (2013.01); *G06F 3/1296* (2013.01); *H04N 1/00204* (2013.01)

(58) Field of Classification Search
USPC ........................................................ 358/1.15
See application file for complete search history.

(56) References Cited

U.S. PATENT DOCUMENTS

| | | |
|---|---|---|
| 5,305,199 A | 4/1994 | LoBiondo et al. |
| 5,720,015 A | 2/1998 | Martin et al. |
| 6,025,925 A | 2/2000 | Davidson et al. |
| 6,248,996 B1 | 6/2001 | Johnson et al. |
| 6,674,545 B1 | 1/2004 | Atsumi |
| 6,965,931 B2 | 11/2005 | Helms |
| 7,177,034 B2 | 2/2007 | Nakagawa et al. |
| 7,190,478 B2 | 3/2007 | Caffary et al. |
| 7,401,877 B2 | 7/2008 | Campbell et al. |
| 7,773,246 B2 | 8/2010 | Oh et al. |
| 7,957,019 B2 | 6/2011 | Swift et al. |
| 8,104,685 B2 | 1/2012 | Seo |
| 8,130,396 B2 | 3/2012 | Ikegami et al. |

(Continued)

OTHER PUBLICATIONS

Office Action Issued Mar. 13, 2014 for Co-Pending U.S. Appl. No. 13/673,733.

(Continued)

*Primary Examiner* — Vu B Hang
(74) *Attorney, Agent, or Firm* — Basch & Nickerson LLP

(57) ABSTRACT

A system and method for providing printing services to a mobile device connected to a network provides a remote print service provider server and local printers. The mobile device transmits a printer location request to the remote print service provider server. The remote print service provider server determines a physical location of the mobile device; determines which local printers are located within a predetermined parameter of the physical location of the mobile device; and transmits information to the mobile device identifying physical locations of local printers with respect to the physical location of the mobile device. The mobile device selects a local printer identified by the remote print service provider server and transmits, to the remote print service provider server, a print request. The remote print service provider server transmits the print request to the selected local printer.

4 Claims, 17 Drawing Sheets

(56) References Cited

U.S. PATENT DOCUMENTS

| | | |
|---|---|---|
| 8,253,998 B2 | 8/2012 | Tsurui |
| 8,259,336 B2 | 9/2012 | Kujirai et al. |
| 8,274,697 B2 | 9/2012 | Sawaguchi |
| 8,284,440 B2 | 10/2012 | Silverbrook et al. |
| 8,290,707 B2 | 10/2012 | Skarine |
| 8,300,249 B2 | 10/2012 | Arai |
| 8,810,835 B2 * | 8/2014 | Asai ............................... 358/1.15 |
| 8,908,205 B2 * | 12/2014 | Watanabe et al. ............ 358/1.15 |
| 2003/0078863 A1 | 4/2003 | Pilu |
| 2003/0086114 A1 * | 5/2003 | Cherry et al. ................. 358/1.15 |
| 2004/0100651 A1 | 5/2004 | Leone, III et al. |
| 2005/0240971 A1 | 10/2005 | Koppich et al. |
| 2006/0136992 A1 | 6/2006 | Shigeeda |
| 2007/0177191 A1 * | 8/2007 | Eschbach et al. ............. 358/1.15 |
| 2008/0052710 A1 | 2/2008 | Iwai et al. |
| 2008/0094657 A1 | 4/2008 | Ikegami et al. |
| 2008/0307455 A1 | 12/2008 | Praest |
| 2010/0103824 A1 | 4/2010 | Gilmour |
| 2010/0115410 A1 | 5/2010 | Fu et al. |
| 2010/0268591 A1 | 10/2010 | Gnanasambandam et al. |
| 2011/0197123 A1 | 8/2011 | Caine et al. |
| 2011/0242569 A1 | 10/2011 | Ohara |
| 2012/0013936 A1 | 1/2012 | Sawada |
| 2012/0019867 A1 * | 1/2012 | Prati et al. .................... 358/1.15 |
| 2012/0307272 A1 * | 12/2012 | Suzuki ........................... 358/1.9 |
| 2013/0222838 A1 * | 8/2013 | Kumar et al. ................. 358/1.14 |

OTHER PUBLICATIONS

Office Action Issued Feb. 21, 2014 for Co-Pending U.S. Appl. No. 13/673,738.
Office Action Issued Apr. 17, 2014 for Co-Pending U.S. Appl. No. 13/673,747.
Office Action Issued Feb. 13, 2014 for Co-Pending U.S. Appl. No. 13/673,754.
International Search Report and Written Opinion for PCT/US13/69048, the Foreign Counterpart of U.S. Appl. No. 13/673,758.
International Unity of Invention Report for PCT/US13/69048, the Foreign Counterpart of U.S. Appl. No. 13/673,758.
Co-Pending U.S. Appl. No. 13/673,733.
Co-Pending U.S. Appl. No. 13/673,738.
Co-Pending U.S. Appl. No. 13/673,747.
Co-Pending U.S. Appl. No. 13/673,754.

* cited by examiner

| NAME | ADDRESS | DISTANCE |
|---|---|---|
| NAME1 | 123 STREET ST | 3 MILES |
| NAME2 | 234 ROAD RD | 5 MILES |
| NAME3 | 456 A STREET | 10 MILES |

NETWORKED PRINTING SYSTEMS

BACKGROUND

Conventional printers and multifunction-devices (printing devices) are capable of being citizens in a network environment. These conventional printing systems can offer a wide range of functionality. In many instances, the user of the printing device rarely or infrequently needs to use the entire range of offered functionality.

In addition to offering a wide range of functionality, a conventional networked printing device may include a built-in processor, hard drive for data storage, a web server for communicating on a network, and sophisticated management software.

Once a conventional networked printing device is physically connected to a network, such as an intranet (local area network—LAN), the printer can be either managed directly from a computing device (such as a local workstation) or from a standard web browser or any web-enabled application residing on a local workstation or remote workstation.

Conventional management software enables administrators to monitor, configure, and troubleshoot a conventional networked printing device from a web browser or a web enabled application.

In such conventional situations, post-purchase users are responsible for supplying and replacing toner/ink cartridges and paper for the printers. However, many users can readily identify the proper toner/ink cartridges and/or paper needed for the printer.

As noted above, the conventional printing device often offer a wide range of functionality which the user does not frequently need, which causes many users to over buy so that the user can have a certain functionality during that rare occurrence that it is needed.

Some conventional printers offer a user very little information about the status of the printer by using a form of "idiot" lights to communicate issues with the printer. For example, some conventional printers have illuminated a single light to signal any and all problems that the printer has detected, while other printers have used multiple lights to signal whether the problem was associated with the paper path or with ink.

Newer printers have utilized LCD displays to display a greater amount of information to assist printer users; however, the cost of LCD displays limits the use and size of the LCD display. More specifically, a small LCD display can provide error messages that users find cryptic, such as "error J2," requiring the user to turn to some other source of information to understand the issue.

One such source of information is the conventional printed user manual. These manuals increase both the printer's manufacture and distribution costs. Additionally, with the use of programmable updateable printers, the information in a printer user manual (hardcopy or electronic) can become quickly outdated.

It is further noted that with the advent of the internet, mobile and smart phones, and wireless network access, people are no longer tied to the personal computer on their desk. This has also enabled a great reduction in the paper documents people must generate, store, and transport to collaborate and communicate with others.

Most documents spend the majority of their lifetime in electronic form because of the ease with which the electronic document can be modified and shared. Notwithstanding the benefits of an electronic document, some people continue to prefer a hard copy of a document for some tasks.

Frequently, these people are away from their own computer networks and/or printers when they decide to make a hard copy of an electronic document, but cannot generate a hardcopy because they do not have access to a local printer although they may be located at a place where they are surrounded by idle printers.

Other examples of conventional printing devices are disclosed in U.S. Pat. No. 5,305,199; U.S. Pat. No. 5,720,015; U.S. Pat. No. 6,025,925; U.S. Pat. No. 6,674,545; U.S. Pat. No. 6,965,931; U.S. Pat. No. 7,177,034; U.S. Pat. No. 7,190,478; U.S. Pat. No. 7,957,019; and U.S. Pat. No. 8,130,396.

The entire contents of U.S. Pat. No. 5,305,199; U.S. Pat. No. 5,720,015; U.S. Pat. No. 6,025,925; U.S. Pat. No. 6,674,545; U.S. Pat. No. 6,965,931; U.S. Pat. No. 7,177,034; U.S. Pat. No. 7,190,478; U.S. Pat. No. 7,957,019; and U.S. Pat. No. 8,130,396 are hereby incorporated by reference.

Furthermore, Published US Patent Application Number 2002/0048036-A1; Published US Patent Application Number 2006/0136992-A1; Published US Patent Application Number 2010/0103824-A1; Published US Patent Application Number 2010/0268591-A1; and Published US Patent Application Number 2012/0013936-A1 disclose examples of conventional printing devices.

The entire contents of Published US Patent Application Number 2002/0048036-A1; Published US Patent Application Number 2006/0136992-A1; Published US Patent Application Number 2010/0103824-A1; Published US Patent Application Number 2010/0268591-A1; and Published US Patent Application Number 2012/0013936-A1 are hereby incorporated by reference.

With respect to these various examples, the disclosed conventional printing devices suffer from the various issues discussed above.

Thus, it would be desirable to provide a printing system which is fully functional, but the user only pays for the functionality actually used.

Moreover, it would be desirable to provide a printing system which can provide a user with an option to display printer related information on a secondary large display device.

In addition, it would be desirable to provide a printing system which can provide a user the capability to utilize surrounding idle local printers which are not associated with the user's intranet.

BRIEF DESCRIPTION OF THE DRAWINGS

The drawings are only for purposes of illustrating various embodiments and are not to be construed as limiting, wherein:

FIG. 16 illustrates an example of displayed information associated with the identity of surrounding idle local printers not associated with the user's intranet.

DETAILED DESCRIPTION

Figure 1:
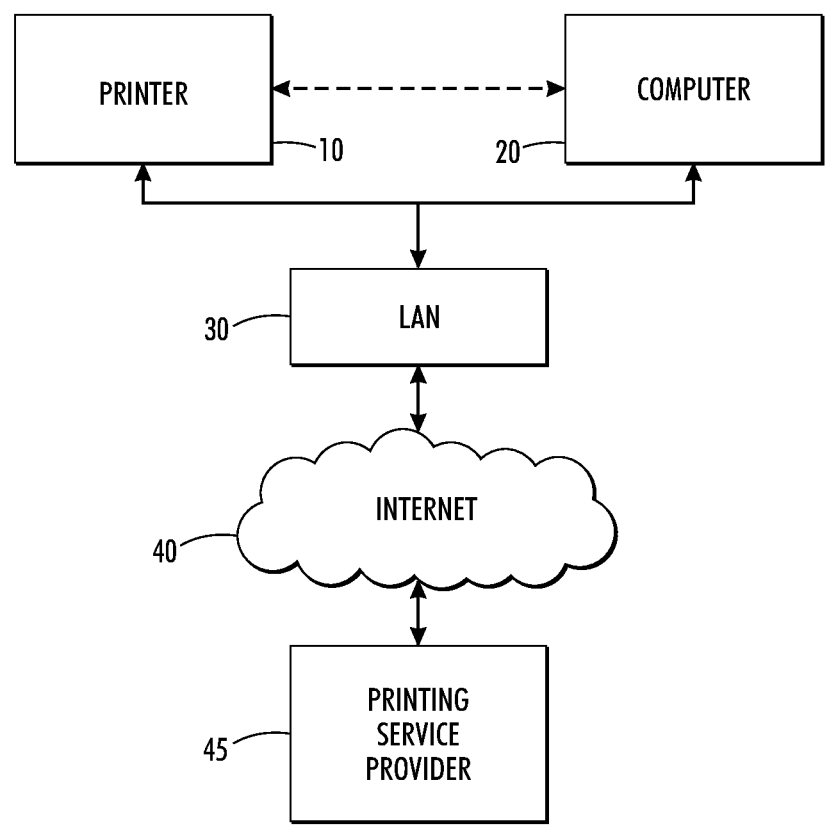
FIG. 1 illustrates a schematic of a system for providing a user with a printer having a wide range of functionality but enables an a la carte selection of the functionality.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

In the various embodiments described below, although the embodiments have been described utilizing the identification of specific hardware, firmware, and/or software, the functionality, services, and/or features may be realized in a cloud environment.

A cloud environment uses of computing resources (hardware and software) that are delivered as a service over a network (typically the Internet). For example, in a cloud environment, a user can "rent" application software and/or databases, wherein the "cloud" providers manage the infrastructure and platforms on which the applications run, and the databases are stored.

In another example, end users may access cloud-based applications through a web browser or a light-weight desktop or mobile app while the software and user's data are stored on servers at a remote location.

As mentioned above, an end user may desire to have a printer that is fully functional, but only have to "pay" for certain functions based upon an a la carte model.

As illustrated in FIG. 1, a user can lease or "purchase" a printer 10, which is fully functional, but is configured by the printing service provider 45 to be capable only of performing a subset of the functionality of the printer 10.

The printer 10 can be connected (dashed line) to a computer 20 as a local printer or connected to a local area network (LAN) or intranet 30 as a networked printer.

The LAN 30 is connected to the internet 40, which provides a connection to the printing service provider 45.

The system of FIG. 1 provides a la carte reproduction services for an end user through the end user's local printer. The local printer 10 may be locally connected to a computer 20 or to a LAN 30. The printer 10 is capable of performing multiple operational printing modes, wherein the printer 10 is configured, in a normal operational printing state, to perform a subset of the multiple operational printing modes.

The printer 10 includes a user interface (not shown) to enable a user to select an operational printing mode. This user interface can be located on the printer 10 or be based in the computer 20.

It is noted that the printer 10 being installed may come from the manufactured having all of its operational printing modes disabled. Thus, upon the printer 10 being installed, the printer 10 establishes a communication link with the printing service provider 45, directly through a network connection or through the computer 20 connected to the printer 10. The printing service provider 45, after authenticating/authorizing the printer 10 and/or user, configures the printer 10 such that the appropriate operational printing modes associated with the printer/user relationship with the printing service provider 45 are enabled.

It is further noted that the printer 10 may come from the manufactured pre-configured such that the appropriate operational printing modes associated with the printer/user relationship with the printing service provider 45 are enabled.

The printer 10, in response to a user selecting an operational printing mode not included in subset of the multiple operational printing modes, communicates with the printing service provider 45 to request authorization to perform the user selected operational printing mode. The printing service provider 45 can configure the printer 10 to perform the selected operational printing mode. Upon completion of the selected operational printing mode, the printer 10 reverts back to the configuration corresponding to a normal operational printing state.

This reconfiguration can be automatically performed, can be performed after a predetermined amount of time has lapsed, or can be done by the printing service provider 45 interacting with the printer 10.

The printing service provider 45 can also require authentication information from the user to verify if the user is authorized to request the selected operational printing mode.

In addition, printing service provider 45 can send pricing information back to the user and ask for verification of the request based upon the pricing information.

With respect to the configuration of the printer 10 that corresponds to a normal operational printing state, the configuration of the printer 10 may only allow black and white printing, and the selected operational printing mode corresponds to color printing. In other words, the printer 10 is configured to perform black and white printing in the normal operational state and not to perform color printing in the normal operational state.

In another example, the printer 10 is configured to perform draft quality printing in the normal operational state and not to perform is high quality printing in the normal operational state.

In a third example, the printer 10 is a multi-functional machine and one of the optional modes for selection is scanning. The scanning feature can be further broken down to black and white scanning, color scanning, and/or optical character recognition scanning.

It is noted that the various available operational modes may include color printing, monochrome printing, color scanning, monochrome scanning, low resolution scanning, high resolution scanning, color copying, monochrome copying, low resolution copying, high resolution copying, fax, optical character recognition scanning, scan to destination, scan to multiple destinations, scanning using various protocols, scan to the cloud or internet, scan to SMB, scan to HTTP, scan to USB and/or other printing service provider added value features or solutions, such as job based accounting, etc.

Figure 6:
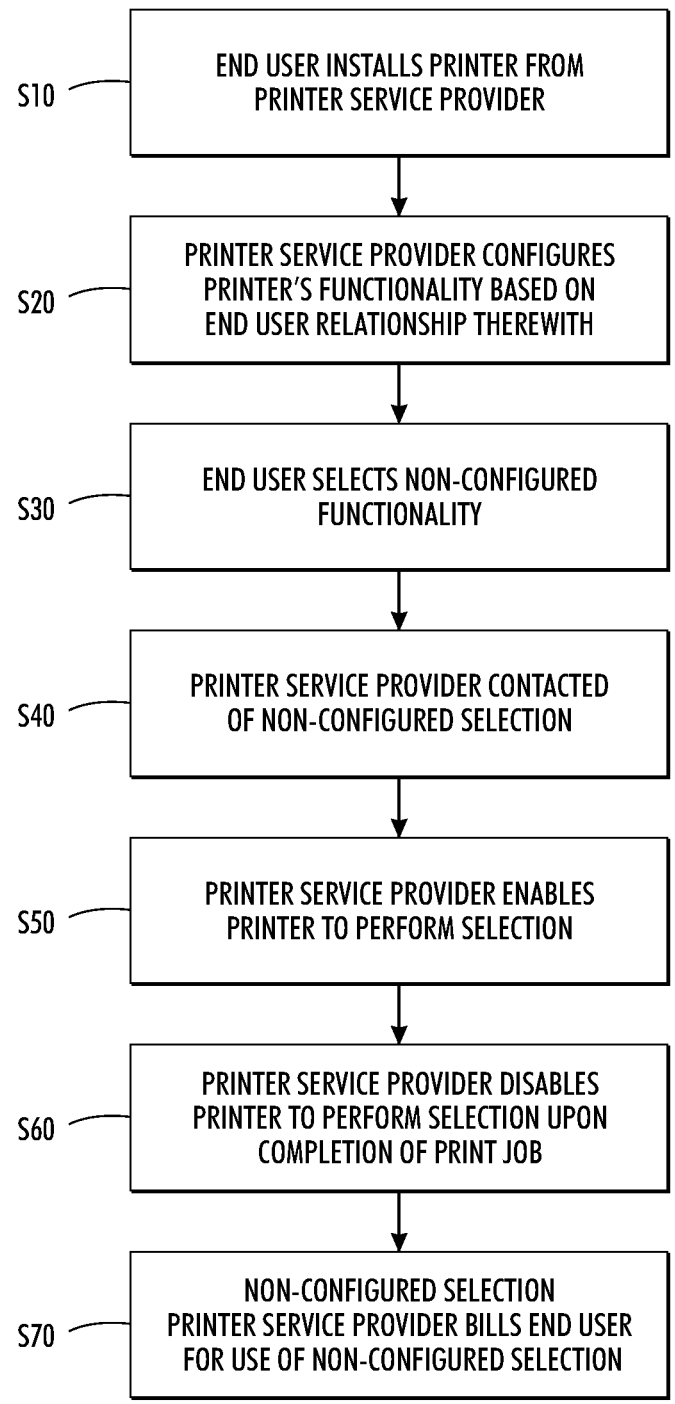
FIG. 6 illustrates a flowchart showing an example of a process for providing a user with a printer having a wide range of functionality but enables an a la carte selection of the functionality.

FIG. 6 illustrates a method for providing a la carte reproduction services. As Illustrated in FIG. 6, at step S10, an end user installs a printer provided by a printer service provider. At step S20, the printer service provider configures printer's functionality based on the end user's relationship therewith. In other words, depending upon the contract terms for purchasing or leasing the printer, the printer is configured to perform a subset of its total functions.

At step S30, the end user selects a non-configured function and the printer service provider is contacted, at step S40, regarding the selection of the non-configured function. The printer service provider, at step S50, reconfigures the printer to be able to perform the selected non-configured function.

It is noted that this reconfiguration can be automatically performed, can be performed after a predetermined amount of time has lapsed, or can be done by the printing service provider interacting with the printer.

At step S60, the printer service provider disables printer to perform selection upon completion of print job. Thereafter, at step S70, the printer service provider can bill the end user for the used functionality.

The printing service provider can also require authentication information from the user to verify if the user is authorized to request the selected operational printing mode.

In addition, printing service provider can send pricing information back to the user and ask for verification of the request based upon the pricing information.

Figure 2:
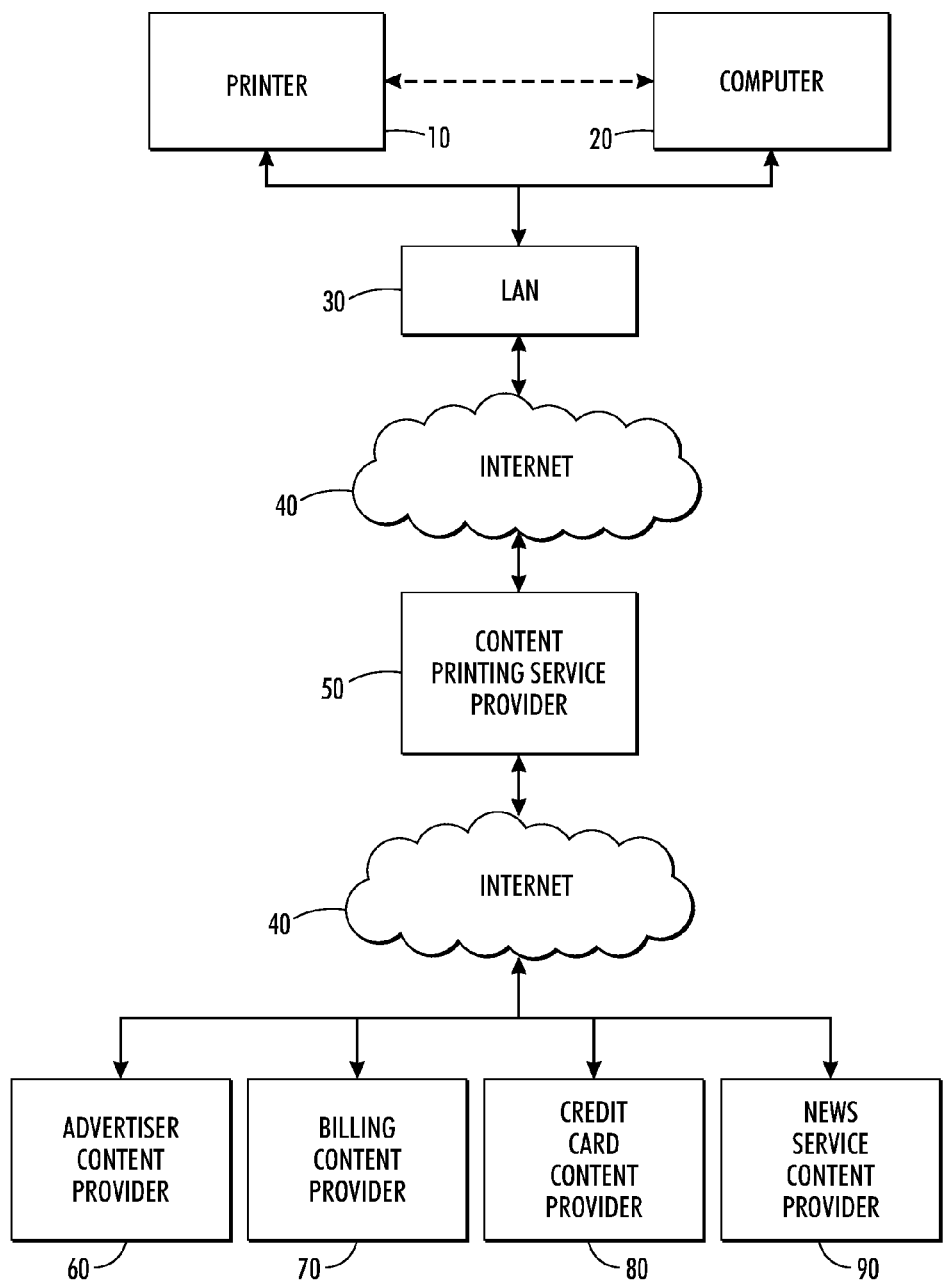
FIG. 2 illustrates a schematic of a system for providing third party content to a local printer.

FIG. 2 illustrates a schematic of a system for providing third party content to a local printer. As illustrated in FIG. 2, a printer 10 can be connected (dashed line) to a computer 20 as a local printer or connected to a local area network (LAN) or intranet 30 as a networked printer.

The LAN 30 is connected to the internet 40, which provides a connection to the content printing service provider 50. The content printing service provider 50 is connected, through the internet 40, to various content providers, such as an advertiser content provider 60, a billing content provider 70, a credit card content provider 80, and/or a news service content provider 90.

The content printing service provider 50 can provide printable content, through the internet 40, to the local client printer 10, the printable content being specified by the local client printer 10 or end user. The content printing service provider 50 retrieves, from a third party content provider (60, 70, 80, and/or 90), the printable content being specified by the local client printer 10 or end user.

It is noted that the content printing service provider 50 can syndicate/integrate the content from the third party content providers (60, 70, 80, and/or 90). In other words, the content printing service provider 50 can collect all the content from the various third party content providers (60, 70, 80, and/or 90), acting as a central repository or central portal, so that the local client printer 10 or end user does not need to communicate with each individual third party content providers (60, 70, 80, and/or 90) to retrieve the content which is to printed by the local client printer 10.

The local client printer 10 prints the printable content received from the content provider server 50.

It is noted that the content printing service provider 50 could provide the end user with a local client printer 10 for a reduced price in exchange for allowing the content printing service provider 50 to print certain content on the local client printer 10; i.e., advertising.

It is noted that the end user could contract with the content printing service provider 50 to retrieve certain content from third party providers, such as billing statements from utility companies, statements from banks and/or credit card services, or news from a subscription news service.

The content printing service provider 50 would create a relationship with these third party providers based upon the end user's request. This relationship may require the content printing service provider 50 to provide some form of authentication to the third party authorizing the requested content. Based upon this relationship, the end user, through the local client printer 10 or computer 20, could poll the content printing service provider 50 for printable content.

In addition, the end user, through the local client printer 10 or computer 20, could poll the content printing service provider 50 for printable content which has not been pre-established for printing, such as advertising or coupons.

It is noted that the content services could be provided on a predetermined periodic basis, whenever the printer is turned ON, and/or when the end user makes a manual request.

It is also noted that the content printing service provider 50 could provide the printable content to the local client printer in a portable document format for storing by the end user.

With respect to communications between the content printing service provider 50 and the local client printer 10 or computer 20, the communication protocol may be realized in a variety different ways.

For example, the local client printer 10 may include the capability of forming a secured communication channel, such as a virtual private network (VPN) communication channel, with the content printing service provider 50. In such a situation, the content printing service provider 50 can communicate directly with the local client printer 10, and the local client printer 10 would not be vulnerable to unauthorized print requests from outside the intranet.

In another example, the computer 20 may periodically, manually or automatically, establish a secured communication channel with the content printing service provider 50, and the content printing service provider 50 would download the content to the computer 20 for printing on the local client printer 10.

In a further example, the computer 20 may, manually or automatically, run an application that establishes a secured communication channel with the content printing service provider 50 to allow the computer 20 to poll the content printing service provider 50 for any content relating to the end user.

Lastly, the end user may utilize a web browser to establish a secured communication channel with the content printing service provider 50 to allow the end user to poll the content printing service provider 50 for any content relating to the end user.

Figure 7:
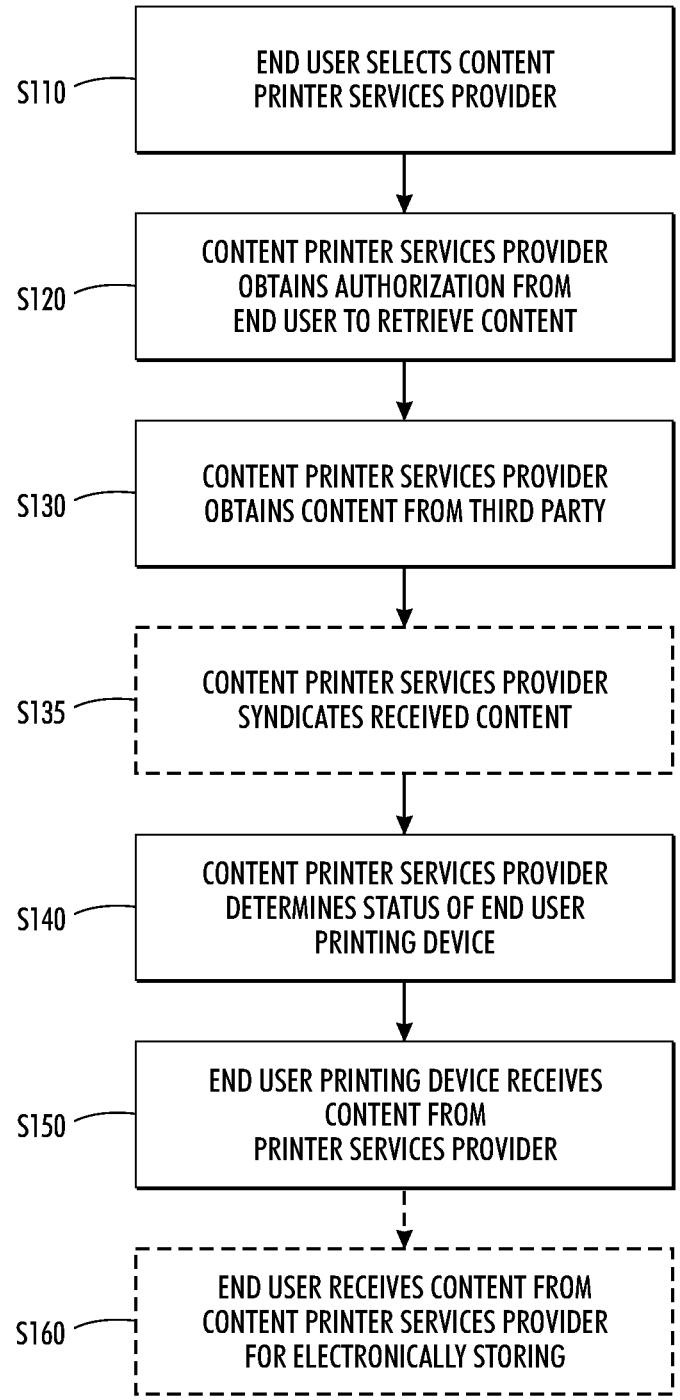
FIG. 7 illustrates a flowchart showing an example of a process for providing third party content to a local printer.

FIG. 7 illustrates a method for providing third party content to a local client printing system. As illustrated in FIG. 7, at step S110, an end user contacts a content printing service provider to select content to be printed on a local printer. At step S120, the content printer services provider obtains authorization from the end user to retrieve the content from a third party, and at step S130, the content printer services provider retrieves the content from the third party.

Optionally, at step S135, the content printing service provider can syndicate or integrate the retrieved content. In other words, the content printing service provider can collect all the content from various third party content providers, acting as a central repository or central portal, so that the local client printer or end user does not need to communicate with each individual third party content providers to retrieve the content which is to printed by the local client printer.

As step S140, the content printer services provider determines the status of end user printing device to verify that the content can be properly printed. Moreover, the content printer services provider can optimize the retrieved content for proper printing on the end user's printer.

At step S150, the content printer services provider sends content to end user's printing device, and optionally, at step S160, the content printer services provider can send content to end user in a format that enables electronic storing thereof.

Although the content printer services provider may be sending the content to the end user's printing device, the end user's printing device and the content printer services provider have previously established a communication link between the two such that the end user's printing device is actually pulling the content from the content printer services provider so as to address firewall issues. For example, the end user's printing device or a computing device associated with the end user's printing device may utilize a proxy agent to establish the communication link with the content printer services provider, wherein the communication link may be a secure or non-secure communication channel.

Taking into considerations of the firewall architecture, the devices inside the firewall establish a communication channel (secured or not secured) with the content printer services provider.

Figure 3:
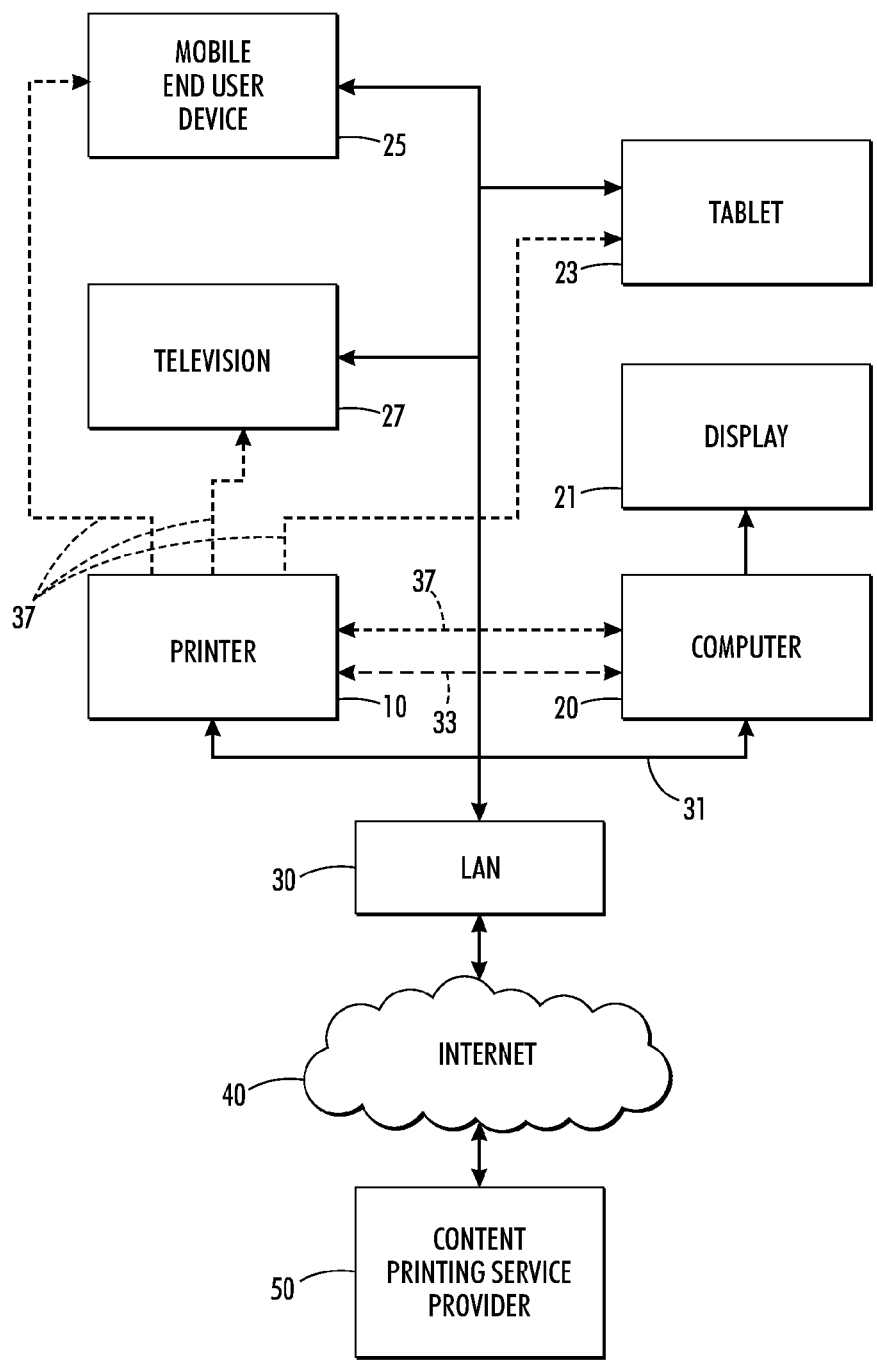
FIG. 3 illustrates a schematic of a system for providing information associated with a local printer to a secondary display device.

FIG. 3 illustrates a system for enabling content to be displayable in association with a local client printing system. As illustrated in FIG. 3, a printer 10 can be connected (dashed line) to a computer 20 as a local printer through a local printer communication channel 33 (as a cable) or connected through a local area network (LAN) or intranet 30 as a networked printer. The printer 10 may also include a storage device (not shown) which stores displayable information and a user interface (not shown) and an associated display (not shown).

The printer 10 may also include a network communication device (not shown) to provide intranet communication channel 31 between the printer 10 and the various devices (computer 20, tablet 23, television 27, and/or mobile end user device 25) connected to the LAN 30, and an ancillary wireless communication transmitter/receiver (not shown) to provide a low-power radio communication channel 37 to ancillary wireless communication enabled devices (computer 20, tablet 23, television 27, and/or mobile end user device 25). The intranet communication channel 31 may be wired or wireless and generally represents the network behind a firewall. The low-power radio communication channel 37 may be, for example, a Bluetooth™ communication channel.

In other words, the printer 10 can communicate with the various devices (computer 20, tablet 23, television 27, and/or mobile end user device 25) through a conventional network protocol or through a Bluetooth™ communication protocol.

The computer 20 may have an associated display 21. The LAN 30 is connected to the internet 40. The LAN 30 may also be connected to a television 27, a tablet 23, and/or a mobile end user device 25. It is noted that the mobile end user device 25 may be a laptop, a personal digital assistance, a mobile phone device, or other mobile device capable of displaying information received from a communication channel.

The printer 10, in response to commands entered through the user interface, may retrieve displayable content from the storage device. The printer 10 may determine if the retrieved displayable content can be displayed upon the display associated with the printer 10. It is noted that the user can also make a determination if the retrieved displayable content can be easily viewed upon the display associated with the printer 10, or the user can just manually assign the retrieved displayable content to an ancillary display device for the displaying thereof.

In one example, the displayable content may be information that the user needs to help remedy a fault situation or to replace or repair a component of the printer 10. In such a situation, the information may be more than a conventional small printer display can readily display, thus it would be preferred that the information is displayed on a larger device.

If the displayable content cannot or should be displayed on the display associated with the printer 10, the printer 10 transmits, through the ancillary wireless communication transmitter/receiver, the retrieved displayable content to an ancillary display device.

In the example illustrated in FIG. 3, the ancillary display devices may be the television 27, tablet 23, and/or mobile end user device 25. It is noted that the mobile end user device 25 may be a laptop, a personal digital assistance, a mobile phone device, or other mobile device capable of displaying information received from a communication channel.

It is noted that the printer 10 may transmit, through the network communication device, the retrieved displayable content to an ancillary display device.

It is also noted that the ancillary wireless communication transmitter/receiver may have the functionality to discover discoverable ancillary display devices, which have been put in a discoverable mode. The discovered ancillary display devices can be listed upon the display associated with the printer 10 so that the user can chose the ancillary display device to receive the displayable content.

It is further noted that network communication device could provide, through intranet communication channel 31, information concerning the ancillary display devices connected to the intranet. The intranet connected ancillary display devices can be listed upon the display associated with the printer 10 so that the user can chose the intranet connected ancillary display device to receive the displayable content.

The printer 10 may, in response to commands entered through the user interface, retrieve displayable content from a remote printing service content provider 55, which is connected to the intranet though the internet 40, through the network communication device. The user may also direct this retrieved displayable content to be directly sent from the remote printing service content provider 55 to an ancillary display device (computer 20, tablet 23, television 27, and/or mobile end user device 25).

In other words, a user, through the printer 10, can retrieve desired information (text, video, audio, and/or combination thereof) located on the internet and direct this information to be displayed on a device which would provide a more effective display than the display associated with the printer 10.

Thus, by enabling the displayable content to be diverted to an ancillary display device, the content can be more effectively displayed instead of relying upon the small display associated with the printer 10.

FIGS. 8-12 illustrate various methods for enabling content to be displayed in association with a local printing system at an ancillary display device.

Figure 8:
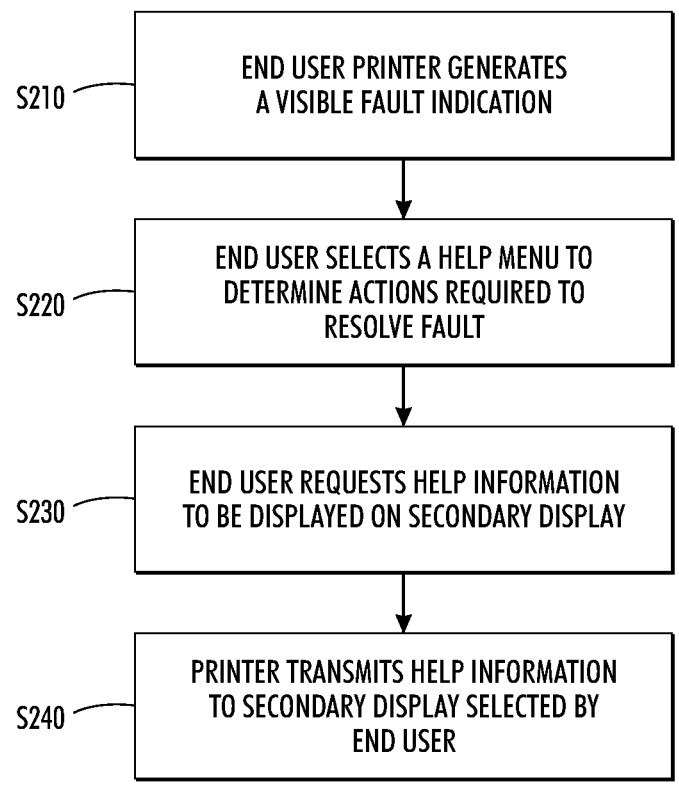
FIG. 8 illustrates a flowchart showing an example of a process for providing information associated with a local printer to a secondary display device.

As illustrated in FIG. 8, at step S210, the local printer generates a visible fault indication. At step S220, an end user selects a help menu to determine actions required to resolve the fault. The end user, at step S230, requests that the help information be displayed on an ancillary display device. The printer, at step S240, then transmits the help information to the ancillary display device selected by the end user.

Figure 9:
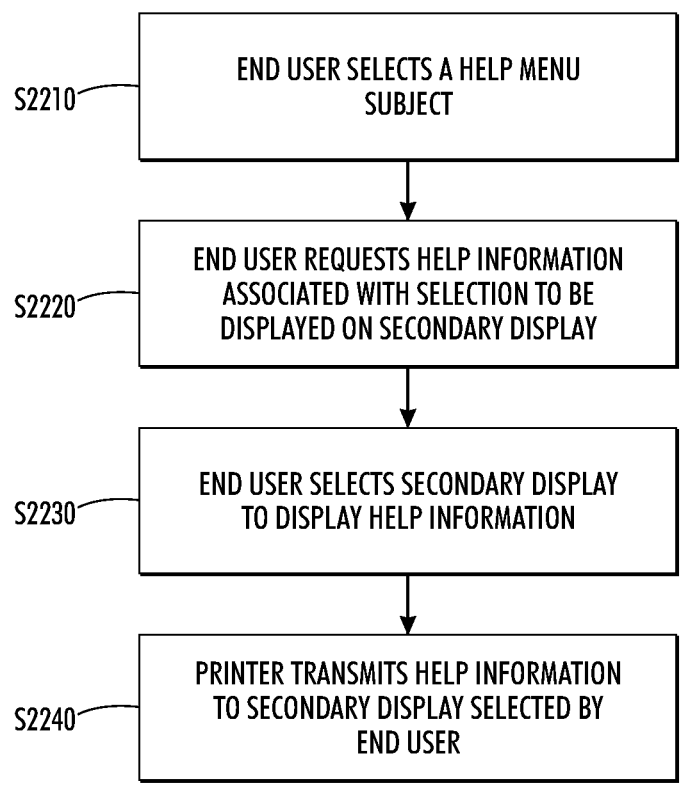
FIG. 9 illustrates a flowchart showing another example of a process for providing information associated with a local printer to a secondary display device.

As illustrated in FIG. 9, at step S2210, the end user selects a help menu subject about which the end user desires more information. At step S2220, the end user requests the help information associated with the selection to be displayed on an ancillary display device. The end user, at step S2230, selects the ancillary display device upon which the help information is to be displayed. The printer, at step S2240, then transmits the help information to the ancillary display device selected by the end user.

Figure 10:
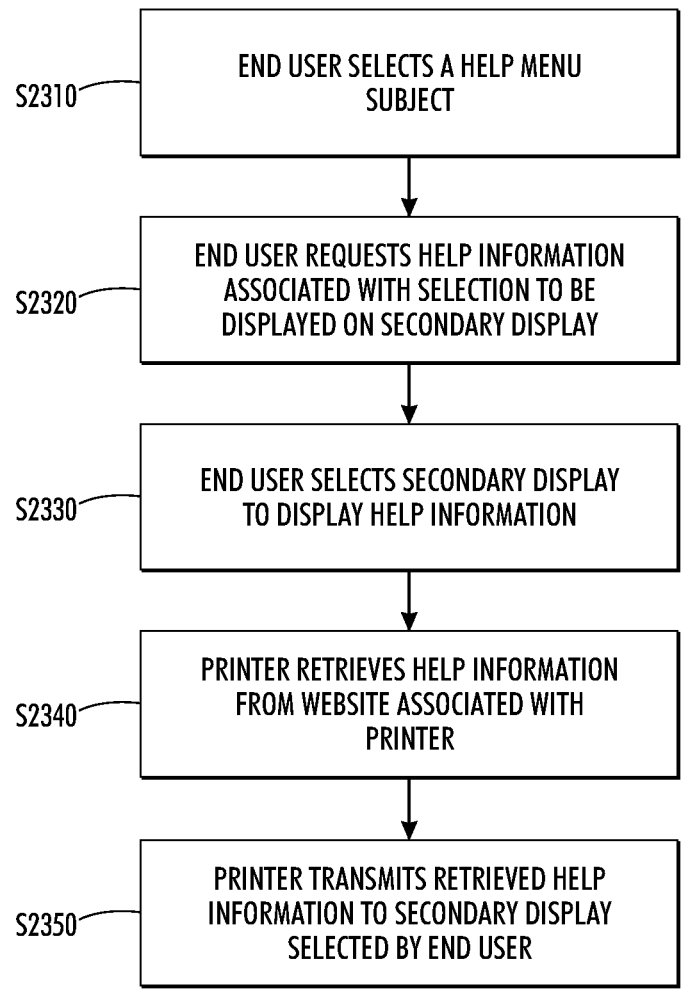
FIG. 10 illustrates a flowchart showing another example of a process for providing information associated with a local printer to a secondary display device.

As illustrated in FIG. 10, at step S2310, the end user selects a help menu subject about which the end user desires more information. At step S2320, the end user requests the help information associated with the selection to be displayed on an ancillary display device. The end user, at step S2330, selects the ancillary display device upon which the help information is to be displayed. The printer, as step S2340, retrieves help information from website associated with printer. The printer then, at step S2350, transmits the help information to the ancillary display device selected by the end user.

Figure 11:
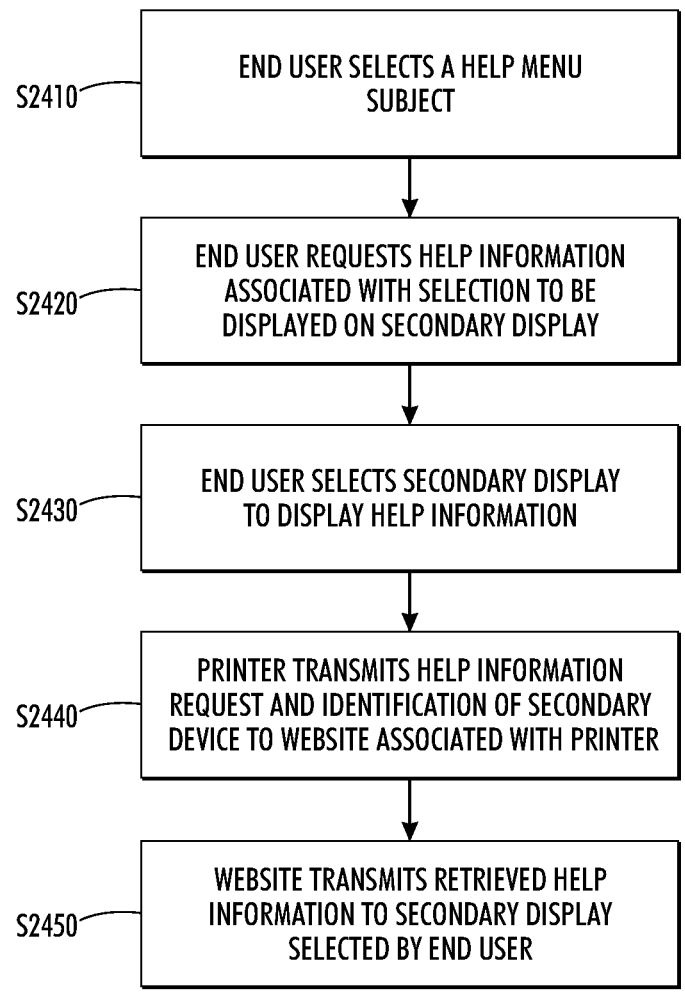
FIG. 11 illustrates a flowchart showing another example of a process for providing information associated with a local printer to a secondary display device.

As illustrated in FIG. 11, at step S2410, the end user selects a help menu subject about which the end user desires more information. At step S2420, the end user requests the help information associated with the selection to be displayed on an ancillary display device. The end user, at step S2430, selects the ancillary display device upon which the help information is to be displayed. The printer, as step S2440, transmits help information request and identification of secondary device to a website associated with printer or a printer provider's content server. The website or printer provider's content server then, at step S2450, transmits the help information to the ancillary display device selected by the end user.

Figure 12:
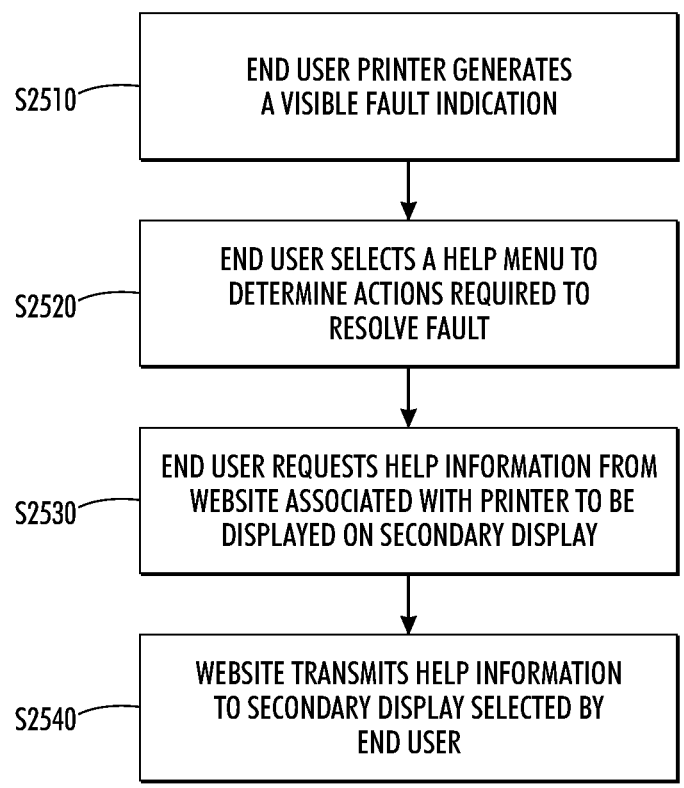
FIG. 12 illustrates a flowchart showing another example of a process for providing information associated with a local printer to a secondary display device.

As illustrated in FIG. 12, at step S2510, the local printer generates a visible fault indication. At step S2520, an end user selects a help menu to determine actions required to resolve the fault. The end user, at step S2530, requests that the help information from a website associated with the printer or a printer provider's content server to be displayed on an ancillary display device. The website or printer provider's content server, at step S2540, then transmits the help information to the ancillary display device selected by the end user.

In the various embodiments discussed above, the retrieved displayable content is transmitted to an ancillary display device through either an ancillary wireless communication transmitter/receiver or over an intranet communication channel (wired or wireless). The retrieved displayable content is transmitted from either the printer or directly from the website or printer provider's content server. This allows the printer to have a very small display associated therewith, but also utilizes the display capabilities of ancillary display devices to convey the desired information to the user in a more effective manner.

For example, by utilizing an ancillary display device, the information conveyed to the user can be in the form of text, a video, audio, animation, and/or combination thereof, whereas the conventional printer display relies mostly on text to convey the information due to its small dimensions and diminished capabilities. Using different forms of media increases the effectiveness of the conveyed information.

In one embodiment, the ancillary wireless communication transmitter/receiver may be a low-power radio communication device, such as a Bluetooth™ transmitter/receiver.

Figure 4:
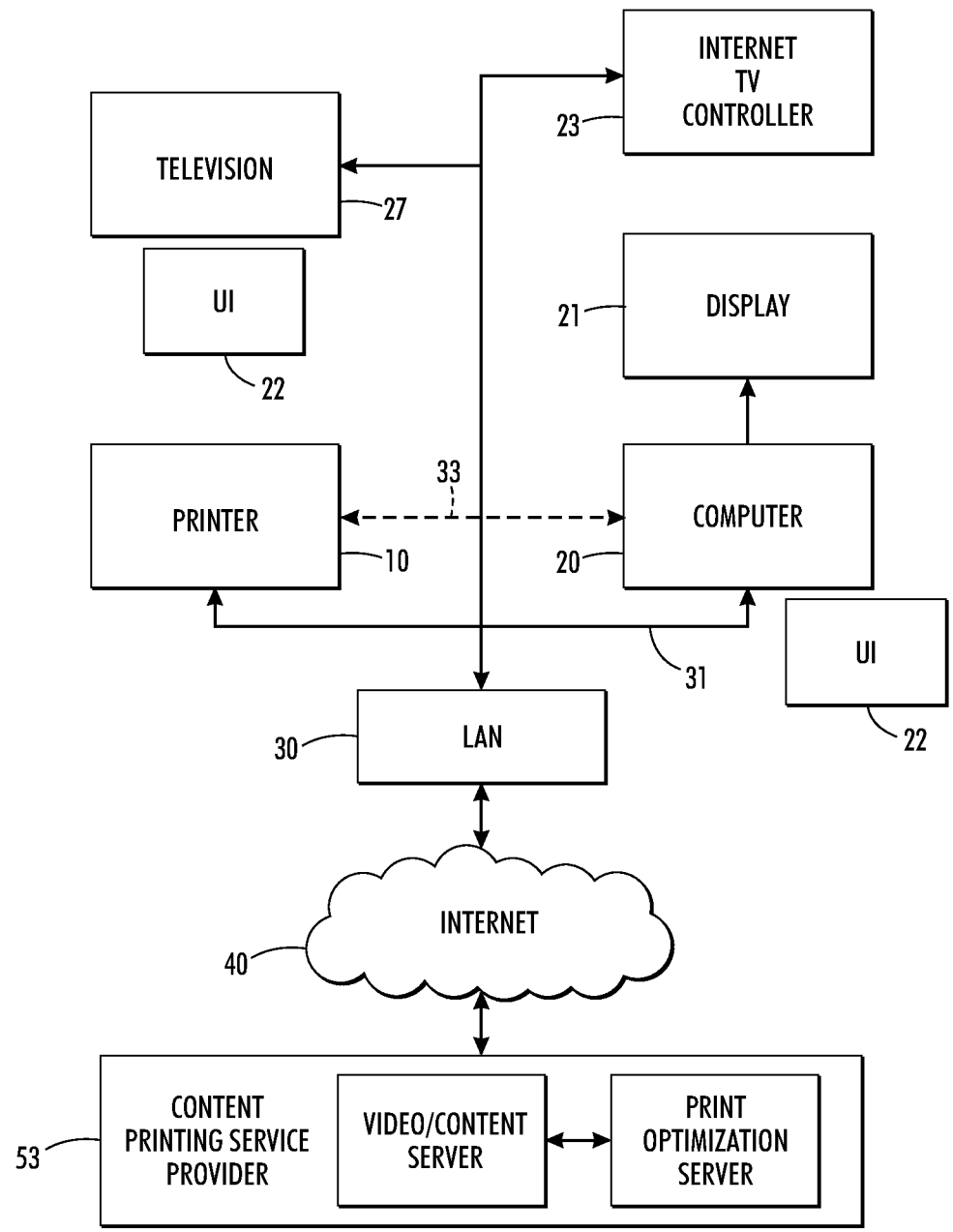
FIG. 4 illustrates a schematic of a system for providing a high resolution image for printing based on a selected frame of a low resolution video image.

FIG. 4 illustrates a system for providing extra-high resolution or optimized prints from viewed video. As illustrated in FIG. 4, the system includes a printer 10 can be connected (dashed line) to a computer 20 as a local printer through a local printer communication channel 33 (as a cable) or connected through a local area network (LAN) or intranet 30 as a networked printer. The printer 10 may also include a storage device (not shown) which stores displayable information and a user interface (not shown) and an associated display (not shown). The printer 10 may also include a network communication device (not shown) to provide intranet communication channel 31 between the printer 10 and the various devices (computer 20, tablet 23, television 27, and/or mobile end user device 25) connected to the LAN 30.

The computer 20 may have an associated display 21 and user interface 22. The LAN 30 is connected to the internet 40. The LAN 30 may also be connected to a television 27, having an associated user interface 28, and an internet-ready TV controller 23.

The user interface 28, associated with the television 27, enables a user to select an image of the video being viewed on the television to be captured for printing. The internet-ready TV controller 23, in response to a user selecting an image to be captured for printing, generates the video scene identifier (e.g., a frame sequence number) associated with the video being currently displayed on the television 27, using any conventional video frame capture techniques. These video frame capture techniques may be realized by hardware, software, and/or a combination thereof.

The internet-ready TV controller 23 transmits the generated video scene identifier (e.g., captured frame sequence number) to the content printing service provider 53. The content printing service provider 53 responds to the video scene identifier (e.g., the frame sequence number) and retrieves the image file for the desired frame. If the image file is not high definition, the content printing service provider 53 may inform the user of that and ask whether the user still wants a print of that frame.

It is noted that the content printing service provider 53 may also retrieve other content associated with video scene identifier and/or program/movie/show associated with the video scene identifier. This additional or other content may be other high resolution content, highlight shots, key moments stills, box-scores, etc. This additional or other content may include other content that may or may not have been included in the viewed video such as behind the scenes stills, candid camera, written commentary from cast/crew and other "meta" content.

It is noted that the image retrieval and print optimization techniques may be realized by hardware, software, and/or a combination thereof.

The content printing service provider 53 then sends the color optimized image file over the internet to the viewer's printer. Alternately, the viewer might be queried as to which printer the viewer wishes to use to print the image, and the content printing service provider 53 would direct the optimized image file to that printer.

In addition, the user interface 22, associated with the computer 22, can enable a user to select an image of the video being viewed on the display 21 to be captured for printing. The computer 22, in response to a user selecting an image to be captured for printing, generates the video scene identifier associated with the video being displayed on the display 21, using conventional techniques. These video identification techniques may be realized by hardware, software, and/or a combination thereof.

The computer 22 transmits the captured frame sequence number to the content printing service provider 53. The content printing service provider 53 responds to the frame sequence number and retrieves the image file for the desired frame. If the image file is not high definition, the content printing service provider 53 may inform the user of that and ask whether the user still wants a print of that frame.

When the content printing service provider 53 retrieves the desired correct image file, the content printing service provider 53 may send the image to a print optimization server, which takes the image file and optimizes its color and resolution for the viewer's printer. The print optimization server may use knowledge of the viewer's printer to optimize the image file for the printer.

It is noted that the image retrieval and print optimization techniques may be realized by hardware, software, and/or a combination thereof.

The content printing service provider 53 then sends the color optimized image file over the internet to the viewer's printer. Alternately, the viewer might be queried as to which printer the viewer wishes to use to print the image, and the content printing service provider 53 would direct the optimized image file to that printer.

Figure 13:
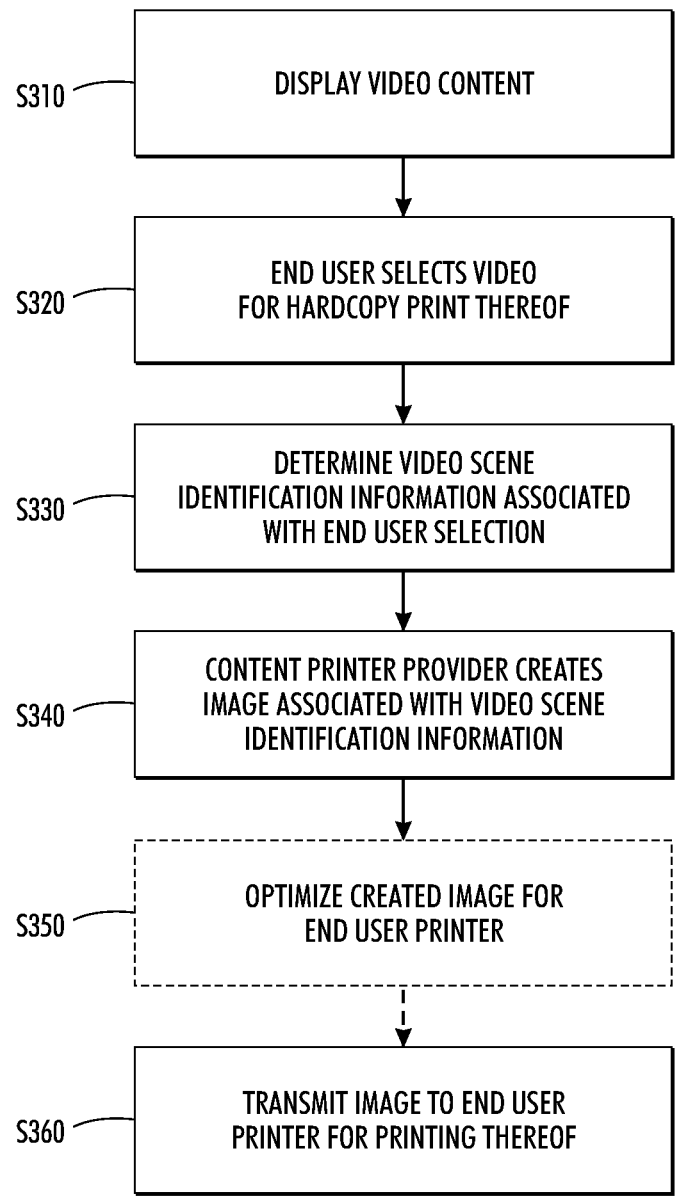
FIG. 13 illustrates a flowchart showing an example of a process for providing a high resolution image for printing based on a selected video image.

FIG. 13 illustrates a method for providing extra-high resolution or optimized prints from viewed video on a display device. As illustrated in FIG. 13, at step S310, video content is displayed. At step S320, an end user selects video for making a hardcopy print thereof. At step S320, either an internet-ready TV controller or computing device determines the video scene identifier (e.g., a frame sequence number) associated with the video being selected by the end user.

The content printing service provider, at step S340, retrieves the image file associated with the video scene identifier. The content printing service provider may, at step S350, send the image to a print optimization server, which takes the image file and optimizes its color and resolution for the viewer's printer.

It is noted that the content printing service provider may also retrieve other content associated with video scene identifier and/or program/movie/show associated with the video scene identifier. This additional or other content may be other high resolution content, highlight shots, key moments stills, box-scores, etc. This additional or other content may include other content that may or may not have been included in the viewed video such as behind the scenes stills, candid camera, written commentary from cast/crew and other "meta" content.

At step S360, the content printing service provider transmits the image and/or other content to end user's printer for printing thereof.

Figure 14:
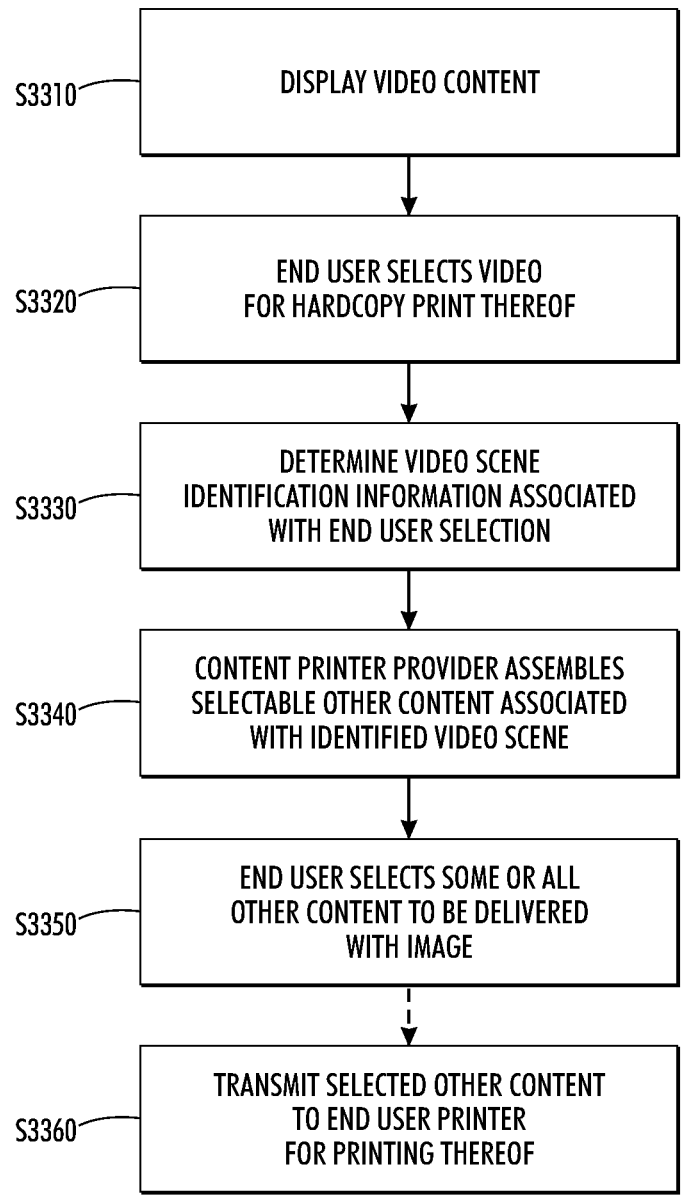
FIG. 14 illustrates a flowchart showing an example of a process for providing other content for printing based on a selected video image.

FIG. 14 illustrates a method for providing extra-high resolution or optimized prints from viewed video on a display device. As illustrated in FIG. 14, at step S3310, video content is displayed. At step S3320, an end user selects video for making a hardcopy print thereof. At step S3320, either an internet-ready TV controller or computing device determines the video scene identifier (e.g., a frame sequence number) associated with the video being selected by the end user.

The content printing service provider, at step S3340, assembles other content associated with video scene identifier and/or program/movie/show associated with the video scene identifier. This additional or other content may be other high resolution content, highlight shots, key moments stills, box-scores, etc. This additional or other content may include other content that may or may not have been included in the viewed video such as behind the scenes stills, candid camera, written commentary from cast/crew and other "meta" content.

The end user may, at step S3350, select some or all other content to be delivered with image. At step S3360, the content printing service provider transmits the selected other content to end user's printer for printing thereof.

Figure 5:
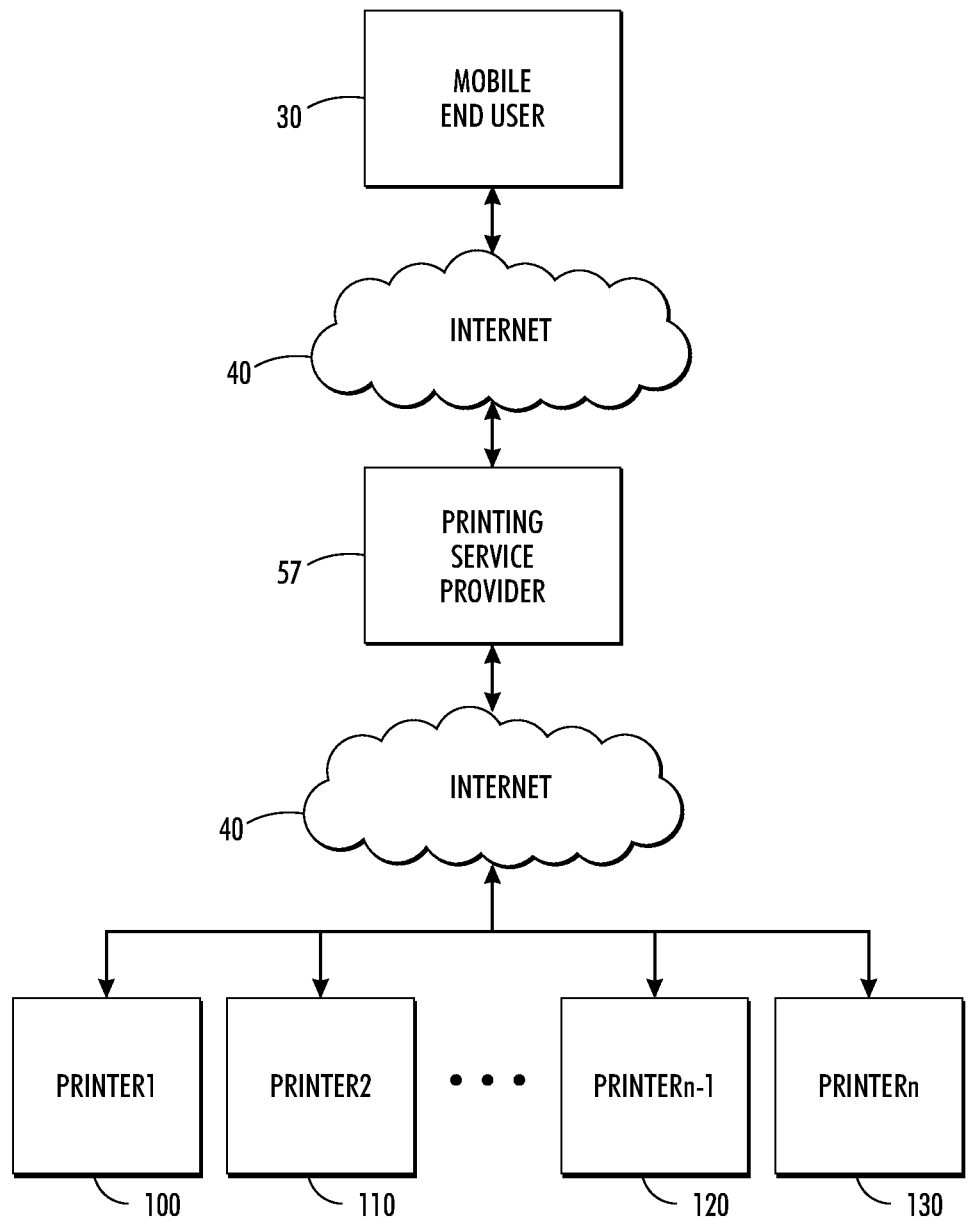
FIG. 5 illustrates a schematic of a system for providing a user access to print, using a surrounding idle local printer, which is not associated with the user's intranet.

FIG. 5 illustrates a system for providing printing services to mobile devices. As illustrated in FIG. 5, a mobile device 30 is operatively connected to the internet 40. A remote printing service provider 57 is operatively connected, through the internet 40, to the mobile device 30.

Multiple local printers (100, 110, 120, and 130) are operatively connected, through the internet 40, to the remote printing service provider 57.

The mobile device 30 may transmit a print request to the remote printing service provider 57. The remote printing service provider 57 determines a physical location of the mobile device 30 and determines which local printers (100, 110, 120, and 130) are located within a predetermined parameter of the physical location of the mobile device 30. Moreover, remote printing service provider 57 may determine which of the determined physically local printers (100, 110, 120, and 130) are capable of executing the print request from the mobile device 30.

The remote printing service provider 57 transmits information to the mobile device 30 identifying local printers (100, 110, 120, and 130) capable of executing the print request and the physical locations of local printers (100, 110, 120, and 130) with respect to the physical location of the mobile device 30.

This information may be conveyed to the mobile device 30 in the text form illustrated in FIG. 16. In this embodiment (FIG. 16), the mobile device 30 may receive information as to the name of the location hosting the local printer, the address of the hosting location, and the distance to the hosting location from the mobile device 30.

Figure 17:
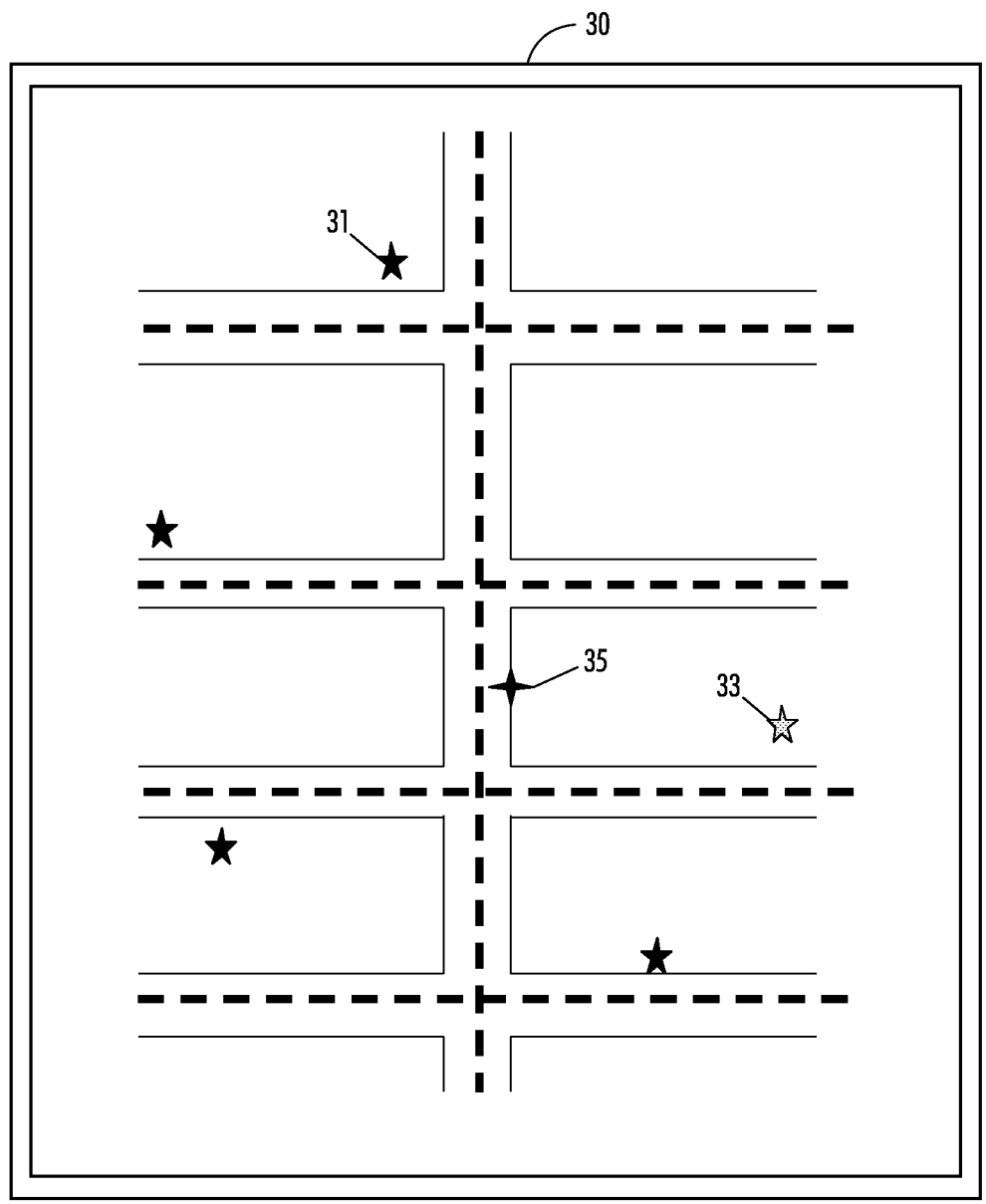
FIG. 17 illustrates an example of graphically displayed information associated with the identity of surrounding idle local printers not associated with the user's intranet.

The information may be conveyed to the mobile device 30 in a graphical map form, as illustrated in FIG. 17. In this embodiment (FIG. 17), the mobile device 30 may receive map information which graphically identifies the location 35 of mobile device 30, the location 31 hosting an available local printer, and optionally, the location 33 hosting an unavailable local printer.

This map information can be augmented with pop-up information providing more information about the hosting location, cost information, and/or distances to the hosting location. This pop-up information can be trigger by having a cursor or pointing device pass over the hosting location icon.

The mobile device 30 selects a local printer identified by the remote printing service provider 57, and the remote printing service provider 57 may transmit the print request to the selected local printer, wherein the selected local printer will process the print request.

Although the remote printing service provider 57 may be sending the print request to the selected local printer, the selected local printer and the remote printing service provider 57 have previously established a communication link between the two such that the selected local printer is actually pulling the print request from the remote printing service provider 57 so as to address firewall issues. For example, the selected local printer or a computing device associated with the selected local printer may utilize a proxy agent to establish the communication link with the remote printing service provider, wherein the communication link may be a secure or non-secure communication channel.

Taking into considerations of the firewall architecture, the selected local printers, inside their respective firewalls, establish a communication channel (secured or not secured) with the remote printing service provider 57.

It is noted that the remote printing service provider 57 may include the print drivers for all the local printers and may process the print request utilizing the print driver of the selected local printer prior to transmitting the print request to the selected local printer.

It is noted that the information being transmitted by the remote printing service provider 57 may include pricing information for each identified local printer.

It is also noted that the remote printing service provider 57 may determine which of the determined physically local printers are capable of executing a substitute print request corresponding to the print request from the mobile device 30. For example, the original print request may be a color printing request and the remote printing service provider 57 may provide information identifying which of the determined physically local printers are capable of executing a substitute print request, such as a black and white printing request.

The mobile device 30 may include a global-positioning satellite tracking system, wherein the global-positioning satellite tracking system provides information to the remote printing service provider 57 identifying a physical location of the mobile device 30.

On the other hand, the user may manually input the location information for use by the remote printing service provider 57.

In another embodiment, the mobile device 30 transmits a printer location request to the remote printing service provider 57. The remote printing service provider 57 determines a physical location of the mobile device 30 and determines which local printers (100, 110, 120, and 130) are located within a predetermined parameter of the physical location of the mobile device 30.

The remote printing service provider 57 transmits information to the mobile device 30 identifying physical locations of local printers (100, 110, 120, and 130) with respect to the physical location of the mobile device 30. The mobile device 30 selects a local printer identified by the remote printing service provider 57 and transmits, to the remote printing service provider 57, a print request, the print request including identification information corresponding to the selected local printer.

The remote printing service provider 57 transmits the print request to the selected local printer, wherein the selected local printer processes the print request.

Figure 15:
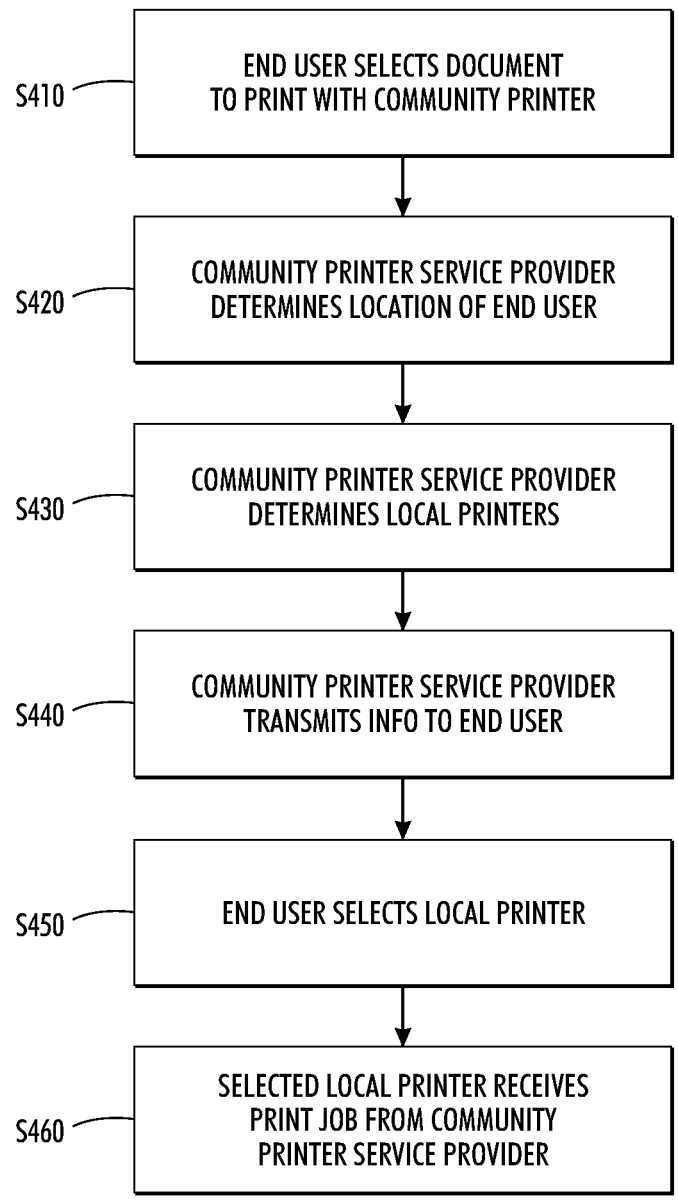
FIG. 15 illustrates a flowchart showing an example of a process for providing a user access to print, using a surrounding idle local printer, which is not associated with the user's intranet.

FIG. 15 illustrates a method for providing printing services to a mobile device connected to a network. As illustrated in FIG. 15, at step S410, an end user selects a document to be printed using a community printer. A community printer service provider, at step S420, determines a location of the end user. At step S430, community printer service provider determines which local printers are located within a predetermined parameter of the physical location of the end user and, at step S440, transmits this information to the end user.

At step S450, the end user selects the local printer, and, at step S460, the community printer service provider transmits the print job to the selected local printer.

In the above descried community of local printers, the community is voluntary network of privately owned printers, wherein the owners have made the printers available to the public. The community printer service provider ties together the printers through the internet. The community printer service provider may take a user's document file and generate a print file for the printer selected by the user.

In the situation, where a printer owner elects to become a member of the community of local printers, the owner may subscribe to the community printer service provider, allowing the community printer service provider to access and control the printer. The owner can indicate the owner's desire to join the voluntary printer network and identifies the owner's printer type and location, price per sheet and hours of operation.

In the above situation, a customer may request a hard copy be printed using a printer in the community of printers. The customer begins by identifying the electronic file for the document to be printed. The customer can be, but need not be, a subscriber of the community printer service provider.

The customer may be anywhere the customer can access the internet and the customer's document. The customer then selects which of the available printers the customer would like to use, wherein the most likely candidate would probably be the one located closest to the customer.

The customer may select a printer from a pull down list, or the printer may be automatically selected for the customer based upon the global-positioning satellite coordinates provided by the owner's mobile device. The customer then transmits this information to the community printer service provider.

The community printer service provider can generate a hard copy for the customer on the selected printer. To create the hardcopy, the community printer service provider may identify the source document file format and, if necessary, converts document from its original format to one supported by the computer associated with the selected printer. Thereafter, the community printer service provider transmits print file to the selected printer, from which the customer may collect the hard copy document.

The community printer service provider may also collect the cost of printing the document from the customer and provide some type of compensation to the owner of the selected printer.

In addition, the community printer service provider may provide scanning, copying, and faxing services, using the same architecture described above. In these situations, the local printers may be multi-function devices capable of printing, copying, scanning, and/or faxing. In the alternative the local devices may be stand-alone scanners, stand-alone copiers, and/or stand-alone fax machines.

In summary, a system for providing a la carte reproduction services may include a reproduction system, the reproduction system including a printing system, the printing system being capable of performing multiple operational printing modes, the printing system being configured, in a normal operational printing state, to perform a subset of the multiple operational printing modes; and a printer service provider server operatively connected to the printing system. The printing system includes a user interface to enable a user to select an operational printing mode. The printing system, in response to a user selecting an operational printing mode not included in subset of the multiple operational printing modes, communicates with the printer service provider server to request authorization to perform the user selected operational printing mode. The printer service provider server requests predetermined information from the printing system. The printer service provider server, upon processing and verification of information received from the printing system, configures the printing system to perform the selected operational printing mode.

The printing system may be configured to perform the subset of the multiple operational printing modes when the printing system first communicates with the printer service provider server, the configuration being based upon a predetermined relationship between the printing system and the printer service provider associated with the printer service provider server.

The printing system may be configured to perform the subset of the multiple operational printing modes when the printing system is manufactured.

A first one of the multiple operational printing modes may be black and white printing and a second one of the multiple operational printing modes may be color printing, the printing system being configured to perform black and white printing in the normal operational state and not to perform color printing in the normal operational state.

A first one of the multiple operational printing modes may be low resolution printing and a second one of the multiple operational printing modes may be high resolution printing, the printing system being configured to perform low resolution printing in the normal operational state and not to perform high resolution printing in the normal operational state.

A first one of the multiple operational printing modes may be draft quality printing and a second one of the multiple operational printing modes may be high quality printing, the printing system being configured to perform draft quality printing in the normal operational state and not to perform is high quality printing in the normal operational state.

The remote reproduction system may include a scanning system, the scanning system being capable of performing multiple operational scanning modes, the scanning system being configured, in a normal operational printing state, to perform a subset of the multiple operational scanning modes.

A first one of the multiple operational scanning modes may be black and white scanning and a second one of the multiple operational scanning modes may be color scanning, the scanning system being configured to perform black and white scanning in the normal operational state and not to perform is color scanning in the normal operational state.

A first one of the multiple operational scanning modes may be low resolution scanning and a second one of the multiple operational scanning modes may be high resolution scanning, the scanning system being configured to perform low resolution scanning in the normal operational state and not to perform is high resolution scanning in the normal operational state.

A third one of the multiple operational scanning modes may be optical character recognition, the scanning system being configured not to perform optical character recognition in the normal operational state.

A third one of the multiple operational scanning modes may be scan to multiple destinations, the scanning system being configured not to perform scan to multiple destinations in the normal operational state.

The remote reproduction system may be configured to prevent copying in the normal operational state and a selectable operational mode is copying enabled.

The remote reproduction system may be configured to prevent job-based accounting in the normal operational state and a selectable operational mode is job-based accounting enabled.

The predetermined information may include payment information from the user, information authenticating the user, and/or information authenticating the printing system.

The printer service provider server may be operatively connected to the printing system through the reproduction system.

A method for providing a la carte reproduction services, may provide a reproduction system, the reproduction system including a printing system, the printing system being capable of performing multiple operational printing modes; configure the printing system, in a normal operational printing state, to perform a subset of the multiple operational printing modes; provide a printer service provider server operatively connected to the printing system; and enable a user to select an operational printing mode through a user interface associated with the printing system. The printing system communicates, in response to a user selecting an operational printing mode not included in subset of the multiple operational printing modes, with the printer service provider server to request authorization to perform the user selected operational printing mode. The printer service provider server requests predetermined information from the printing system. The printer service provider server configures, upon processing and verification of information received from the printing system, the printing system to perform the selected operational printing mode.

A system for providing third party content to a local client printing system, may include a local client printing system; a content provider server operatively connected to the local client printing system; and a third party content provider server operatively connected to the content provider server. The content provider server provides printable content to the local client printing system, the printable content being specified by the local client printing system. The content provider server retrieves, from the third party content provider server, the printable content being specified by the local client printing system. The local client printing system prints the printable content received from the content provider server.

The content provider server may syndicate content retrieved from the third party content provider server.

The local client printing system may poll the content provider server for selectable printable content, the local client printing system selecting which printable content to receive for printing.

The local client printing system may poll the content provider server for selectable third party content providers, the local client printing system selecting third party content provider, the content provider server determining if the selected third party content provider requires user authentication to acquire printable content from the third party content provider server, the content provider server requesting user authentication information, from the local client printing system, when the selected third party content provider requires user authentication to acquire printable content from the third party content provider server, and providing the user authentication information to the third party content provider server to enable the retrieval of the selected printable content.

The third party content provider may have a billing relationship with a user of the local client printing system, and the printable content is a monthly billing statement.

The third party content provider server may automatically provide periodic printable content associated with the authenticated user of the local client printing system to the content provider server, the content provider server providing the periodic printable content to the local client printing system.

The content provider server may provide the periodic printable content to the local client printing system upon receiving proper user authentication information from the local client printing system.

The content provider server may provide the periodic printable content to the local client printing system in a printer friendly displayable format for storing by the local client printing system and in a print format for printing by the local client printing system.

The third party content provider may have a subscriber relationship with a user of the local client printing system, and the printable content is subscription based content.

The third party content provider may have a subscriber relationship with a user of the local client printing system, and the printable content is subscription based content.

The content provider server may provide non-selected content to the local client printing system for printing.

The content provider server may provide non-selected content to the local client printing system for printing based upon a predetermined relationship between the local client printing system and the content provider associated with the content provider server.

A method for providing third party content to a local client printing system, may provide a local client printing system; provide a content provider server connected to the local client printing system; provide a third party content provider server operatively connected to the content provider server; and provide printable content, from the content provider server, to the local client printing system, the printable content being specified by the local client printing system. The content provider server retrieves, from the third party content provider server, the printable content being specified by the local client printing system. The local client printing system prints the printable content received from the content provider server.

A system for enabling content to be displayable in association with a local client printing system may include a local client printing system. The local client printing system includes a printing device, a storage device for storing displayable content, a user interface, the user interface including a display, a network communication device to provide communication between the local client printing system and a network over a network communication channel, and an ancillary wireless communication transmitter/receiver, the ancillary wireless communication transmitter/receiver providing a communication channel to an ancillary display device. The local client printing system, in response to commands entered through the user interface, retrieves displayable content from the storage device. The local client printing system determines if the retrieved displayable content can be displayed upon the display. The local client printing system transmits, through the ancillary wireless communication transmitter/receiver, the retrieved displayable content to the ancillary display device when the local client printing system determines that the retrieved displayable content cannot be displayed upon the display.

The ancillary wireless communication transmitter/receiver may create a low-power radio communication channel.

The local client printing system may transmit, through the ancillary wireless communication transmitter/receiver, the retrieved displayable content to the ancillary display device when a user, through the user interface, provides instructions to transmit the retrieved displayable content to the ancillary display device.

The local client printing system, in response to commands entered through the user interface, may retrieve displayable content from a remote content provider through the network communication device, the local client printing system determining if the retrieved displayable content from the remote content provider can be displayed upon the display, the local client printing system transmitting, through the ancillary wireless communication transmitter/receiver, the retrieved displayable content from the remote content provider to the ancillary display device when the local client printing system determines that the retrieved displayable content from the remote content provider cannot be displayed upon the display.

The local client printing system may transmit, through the ancillary wireless communication transmitter/receiver, the retrieved displayable content from the remote content provider to the ancillary display device when a user, through the user interface, provides instructions to transmit the retrieved displayable content from the remote content provider to the ancillary display device.

The ancillary display device may be a mobile end user device with a display, a mobile computing device with a display, a computing device with a display, and/or a television.

The local client printing system may transmit, through the network communication device, the retrieved displayable content to the ancillary display device.

The ancillary wireless communication transmitter/receiver may include a mode of operation that enables the local client printing system to be discoverable by another device having an ancillary display and ancillary wireless communication functionality.

A system for enabling content to be displayable in association with a local client printing system may include a local client printing system. The local client printing system includes a printing device, a storage device for storing displayable content, a user interface, the user interface including a display, a network communication device to provide communication between the local client printing system and a network over a network communication channel, and an ancillary wireless communication transmitter/receiver, the ancillary wireless communication transmitter/receiver providing a communication channel to an ancillary display device. The local client printing system, in response to commands entered through the user interface, retrieves displayable content from the storage device. The local client printing system transmits, through the ancillary wireless communication transmitter/receiver, the retrieved displayable content to the ancillary display device when a user, through the user interface, provides instructions to transmit the retrieved displayable content to the ancillary display device.

A method for enabling content to be displayable in association with a local client printing system, the local client printing system including a printing device, a storage device for storing displayable content, a user interface, the user interface including a display, a network communication device to provide communication between the local client printing system and a network over a network communication channel, and an ancillary wireless communication transmitter/receiver, the ancillary wireless communication transmitter/receiver providing a communication channel to an ancillary display device, may retrieve, in response to commands entered through the user interface, displayable content from the storage device; determine if the retrieved displayable content can be displayed upon the display; and transmit, through the ancillary wireless communication transmitter/receiver, the retrieved displayable content to the ancillary display device when it is determined that the retrieved displayable content cannot be displayed upon the display.

A method for enabling content to be displayable in association with a local client printing system, the local client printing system including a printing device, a storage device for storing displayable content, a user interface, the user interface including a display, a network communication device to provide communication between the local client printing system and a network over a network communication channel, and an ancillary wireless communication transmitter/receiver, the ancillary wireless communication transmitter/receiver providing a communication channel to an ancillary display device, may retrieve, in response to commands entered through the user interface, displayable content from the storage device; and transmit, through the ancillary wireless communication transmitter/receiver, the retrieved displayable content to the ancillary display device when a user, through the user interface, provides instructions to transmit the retrieved displayable content to the ancillary display device.

A system for enabling content to be displayable in association with a local client printing system may include a local client printing system associated with a printer provider; and a display device operatively connected to the local client printing system. The local client printing system includes a printing device, a user interface, the user interface including a display, and a network communication device to provide communication between the local client printing system and a remote printer provider server associated with the printer provider and to provide communication between the local client printing system and the display device. The local client printing system, in response to commands entered through the user interface, communicates with the remote printer provider server to retrieve displayable content associated with the commands entered through the user interface. The local client printing system, in response to commands entered through the user interface, communicates with the remote printer provider server to identify the display device upon which the retrieved displayable content is to be displayed. The display device receives, from the remote printer provider server, the retrieved displayable content and displays the retrieved displayable content thereupon.

A method for enabling content to be displayable in association with a local client printing system associated with a printer provider and a display device, the local client printing system including a printing device, a user interface, the user interface, a network communication device to provide communication between the local client printing system and a remote printer provider server associated with the printer provider and to provide communication between the local client printing system and the display device, may include the local client printing system, in response to commands entered through the user interface, communicating with the remote printer provider server to retrieve displayable content associated with the commands entered through the user interface; the local client printing system, in response to commands entered through the user interface, communicating with the remote printer provider server to identify the display device upon which the retrieved displayable content is to be displayed; and the display device receiving, from the remote printer provider server, the retrieved displayable content and displaying the retrieved displayable content thereupon.

A system for providing high resolution prints from viewed video, may include a printing device; a computing device operatively connected to the printing device; a display system, operatively connected to the computing device and a network, to display video being viewed, the video being received from a content provider over the network; and a user interface, operatively connected to the display device, to control displaying of video on the display device. The user interface enables a user to select an image in the viewed video to be captured for printing. The computing device, in response to a user selecting video to be captured for printing, generates video scene identification information corresponding to the select video. The computing device transmits the video scene identification information to the content provider. The printing device receives, from the content provider, a high resolution image corresponding to the video scene identification information. The printing device prints the received high resolution image.

The content provider transmits selectable other content associated with the video scene identification information, the other content including content not included in the selected viewed video, meta content of the selected viewed video, or content associated with the selected viewed video.

The computing device transmits information corresponding to the printing device's operational specifications such that the printing device receives a high resolution image corresponding to the video scene identification information which has been optimized for printing on the printing device.

The display system is a television and the computing device is an internet ready television controller. The user interface is a remote controller.

The display system and the computing device are combined in a mobile computing system.

The display system and the computing device are combined in a personal computing system.

The system display system and the computing device are combined in mobile end user device.

The computing system receives information from the content provider that no high resolution image is available, the user interface enabling the user to accept or reject the non-high resolution image for printing.

A method for providing high resolution to be printed on a printing device, from video viewed on a display device, may include viewing video, on the display device, the video being received from a content provider over a network; controlling, thought a user interface displaying of the video on the display device; selecting, thought the user interface, an image in the viewed video to be captured for printing; generating, in response to a user selecting an image to be captured for printing, video scene identification information corresponding to the select video; transmitting the video scene identification information to the content provider; receiving, from the content provider, a high resolution image corresponding to the video scene identification information; and printing the received high resolution image.

A system for providing printing services to mobile devices may include a mobile device; a remote print service provider server operatively connected to the mobile device; and local printers operatively connected to the remote print service provider server. The mobile device transmits a print request to the remote print service provider server. The remote print service provider server determines a physical location of the mobile device. The remote print service provider server determines which local printers are located within a predetermined parameter of the physical location of the mobile device and determining which of the determined physically local printers are capable of executing the print request from the mobile device. The remote print service provider server transmits information to the mobile device identifying local printers capable of executing the print request and physical locations of the local printers with respect to the physical location of the mobile device.

The mobile device selects a local printer identified by the remote print service provider server, the remote print service provider server transmitting the print request to the selected local printer, the selected local printer processing the print request.

The remote print service provider server includes print drivers for all the local printers and processes the print request utilizing the print driver of the selected local printer prior to transmitting the print request to the selected local printer.

The information transmitted by the remote print service provider server includes pricing information for each identified local printer.

The local printers are owned by third parties.

The remote print service provider server determines which of the determined physically local printers are capable of executing a substitute print request corresponding to the print request from the mobile device.

The print request corresponds to color printing and substitute print request corresponds to black and white printing.

The mobile device includes a global-positioning satellite tracking system, the global-positioning satellite tracking system providing information to the remote print service provider server identifying a physical location of the mobile device.

The remote print service provider server providing map information corresponding to the local printers which are located within the predetermined parameter of the physical location of the mobile device.

The system may include local reproduction systems, each local reproduction system including a scanning device and a printing device; the mobile device transmitting a scanning request to the remote print service provider server; the remote print service provider server determining a physical location of the mobile device; the remote print service provider server determining which local reproduction systems are located within a predetermined parameter of the physical location of the mobile device and determining which of the determined physically local reproduction systems are capable of executing the scanning request from the mobile device; the remote print service provider server transmitting information to the mobile device identifying local reproduction systems capable of executing the scanning request and physical locations of the local reproduction systems with respect to the physical location of the mobile device.

The system may include local scanning devices; the mobile device transmitting a scanning request to the remote print service provider server; the remote print service provider server determining a physical location of the mobile device; the remote print service provider server determining which local scanning devices are located within a predetermined parameter of the physical location of the mobile device and determining which of the determined physically local scanning devices are capable of executing the scanning request from the mobile device; the remote print service provider server transmitting information to the mobile device identifying local scanning devices capable of executing the scanning request and physical locations of the local scanning devices with respect to the physical location of the mobile device.

The system may include local reproduction systems, each local reproduction system including a scanning device and a printing device; the mobile device transmitting a copying request to the remote print service provider server; the remote print service provider server determining a physical location of the mobile device; the remote print service provider server determining which local reproduction systems are located within a predetermined parameter of the physical location of the mobile device and determining which of the determined physically local reproduction systems are capable of executing the copying request from the mobile device; the remote print service provider server transmitting information to the mobile device identifying local reproduction systems capable of executing the copying request and physical locations of the local reproduction systems with respect to the physical location of the mobile device.

The system may include local reproduction systems, each local reproduction system including a scanning device and a printing device; the mobile device transmitting a fax request to the remote print service provider server; the remote print service provider server determining a physical location of the mobile device; the remote print service provider server determining which local reproduction systems are located within a predetermined parameter of the physical location of the mobile device and determining which of the determined physically local reproduction systems are capable of executing the fax request from the mobile device; the remote print service provider server transmitting information to the mobile device identifying local reproduction systems capable of executing the fax request and physical locations of the local reproduction systems with respect to the physical location of the mobile device.

The system may include local fax devices; the mobile device transmitting a fax request to the remote print service provider server; the remote print service provider server determining a physical location of the mobile device; the remote print service provider server determining which local fax devices are located within a predetermined parameter of the physical location of the mobile device and determining which of the determined physically local fax devices are capable of executing the fax request from the mobile device; the remote print service provider server transmitting information to the mobile device identifying local fax devices capable of executing the fax request and physical locations of the local fax devices with respect to the physical location of the mobile device.

A system for providing printing services to mobile devices may include a mobile device; a remote print service provider server operatively connected to the mobile device; and local printers operatively connected to the remote print service provider server. The mobile device transmits a printer location request to the remote print service provider server. The remote print service provider server determines a physical location of the mobile device. The remote print service provider server determines which local printers are located within a predetermined parameter of the physical location of the mobile device. The remote print service provider server transmits information to the mobile device identifying physical locations of local printers with respect to the physical location of the mobile device. The mobile device selects a local printer identified by the remote print service provider server and transmitting, to the remote print service provider server, a print request, the print request including identification information corresponding to the selected local printer. The remote print service provider server transmits the print request to the selected local printer, the selected local printer processing the print request.

A method for providing printing services to a mobile device connected to a network may include providing a remote print service provider server operatively connected to the mobile device; providing local printers operatively connected to the remote print service provider server; transmitting, from the mobile device, a print request to the remote print service provider server; the remote print service provider server determining a physical location of the mobile device; the remote print service provider server determining which local printers are located within a predetermined parameter of the physical location of the mobile device and determining which of the determined physically local printers are capable of executing the print request from the mobile device; and the remote print service provider server transmitting information to the mobile device identifying local printers capable of executing the print request and physical locations of local printers with respect to the physical location of the mobile device.

A method for providing printing services to a mobile device connected to a network may include providing a remote print service provider server operatively connected to the mobile device; providing local printers operatively connected to the remote print service provider server; the mobile device transmitting a printer location request to the remote print service provider server; the remote print service provider server determining a physical location of the mobile device; the remote print service provider server determining which local printers are located within a predetermined parameter of the physical location of the mobile device; the remote print service provider server transmitting information to the mobile device identifying physical locations of local printers with respect to the physical location of the mobile device; the mobile device selecting a local printer identified by the remote print service provider server and transmitting, to the remote print service provider server, a print request, the print request including identification information corresponding to the selected local printer; and the remote print service provider server transmitting the print request to the selected local printer, the selected local printer processing the print request.

A method for providing printing services to a mobile device connected to a network may include providing a remote print service provider server; providing local printers operatively connected to the remote print service provider server; each local printer providing the remote print service provider server with information associated with a physical location of the local printer; each local printer providing the remote print service provider server with information identifying which functions of the local printer are being made available to an end user of the mobile device; each local printer providing the remote print service provider server with information identifying when the local printer is available to provide the identified functionality to the end user of the mobile device; and the remote print service provider server creating a network of community local printers which are available for utilization by the end user of the mobile device.

The method may include each local printer providing the remote print service provider server with information identifying a cost for utilizing the identified functionality.

A system for providing printing services to a mobile device connected to a network may include a remote print service provider server; and local printers operatively connected to the remote print service provider server. Each local printer provides the remote print service provider server with information associated with a physical location of the local printer. Each local printer provides the remote print service provider server with information identifying which functions of the local printer are being made available to an end user of the mobile device. Each local printer provides the remote print service provider server with information identifying when the local printer is available to provide the identified functionality to the end user of the mobile device. The remote print service provider server creates a network of community local printers which are available for utilization by the end user of the mobile device.

Each local printer provides the remote print service provider server with information identifying a cost for utilizing the identified functionality.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for providing printing services to a mobile device connected to a network, comprising:
   a mobile device;
   a remote print service provider server operatively connected to said mobile device; and
   local printers operatively connected to the remote print service provider server;
   each local printer providing the remote print service provider server with information associated with a physical location of the local printer;
   each local printer providing the remote print service provider server with information identifying which functions of the local printer are being made available to an end user of the mobile device;
   each local printer providing the remote print service provider server with information identifying hours of operation when a local printer is available to provide the identified functionality to the end user of the mobile device;
   said mobile device transmitting a print request to said remote print service provider server;
   said remote print service provider server determining a physical location of said mobile device;
   said remote print service provider server determining which local printers are located within a predetermined parameter of the physical location of said mobile device, determining availability of local printers located within the predetermined parameter of the physical location of said mobile device, and determining which local printers within the predetermined parameter of the physical location of said mobile device are capable of executing the print request from said mobile device;
   said remote print service provider server transmitting, to said mobile device, map information to graphically identify the physical location of said mobile device and to graphically identify physical locations of the local printers which are located within the predetermined parameter of the physical location of said mobile device;
   said remote print service provider server transmitting, to said mobile device, information identifying available functions of the local printers which are located within the predetermined parameter of the physical location of said mobile device and information identifying availability of the local printers which are located within the predetermined parameter of the physical location of said mobile device;
   said mobile device displaying a map using a first graphic to identify the physical location of said mobile device, a second graphic to identify the physical locations of available local printers which are located within the predetermined parameter of the physical location of said mobile device, and a third graphic to identify the physical locations of unavailable local printers which are located within the predetermined parameter of the physical location of said mobile device;
   said mobile device displaying pop-up information, when a user of said mobile device engages a second graphic or a third graphic, the pop-up information providing information communicating a distance between the physical location of said mobile device and the physical location of the local printer associated with the engaged graphic.

2. The system as claimed in claim 1, further comprising:
  each local printer providing the remote print service provider server with information identifying a cost for utilizing the identified functionality;
  said mobile device displaying cost information within the pop-up information, when a user of said mobile device engages a second graphic or a third graphic.

3. A system for providing printing services to a mobile device connected to a network, comprising:
  a mobile device;
  a remote print service provider server operatively connected to said mobile device; and
  local printers operatively connected to said remote print service provider server;
  each local printer providing said remote print service provider server with information associated with a physical location of the local printer;
  each local printer providing said remote print service provider server with information identifying which functions of the local printer are being made available to an end user of the mobile device;
  each local printer providing said remote print service provider server with information identifying hours of operation when a local printer is available to provide the identified functionality to the end user of the mobile device;
  said mobile device transmitting a printer location request to said remote print service provider server;
  said remote print service provider server determining a physical location of said mobile device;
  said remote print service provider server determining which local printers are located within a predetermined parameter of the physical location of said mobile device, determining availability of local printers located within the predetermined parameter of the physical location of said mobile device, and determining which local printers within the predetermined parameter of the physical location of said mobile device are capable of executing a print request from said mobile device;
  said remote print service provider server transmitting, to said mobile device, map information to graphically identify the physical location of said mobile device and to graphically identify physical locations of the local printers which are located within the predetermined parameter of the physical location of said mobile device;
  said remote print service provider server transmitting, to said mobile device, information identifying available functions of the local printers which are located within the predetermined parameter of the physical location of said mobile device and information identifying availability of the local printers which are located within the predetermined parameter of the physical location of said mobile device;
  said mobile device displaying a map using a first graphic to identify the physical location of said mobile device, a second graphic to identify the physical locations of available local printers which are located within the predetermined parameter of the physical location of said mobile device, and a third graphic to identify the physical locations of unavailable local printers which are located within the predetermined parameter of the physical location of said mobile device;
  said mobile device displaying pop-up information, when a user of said mobile device engages a second graphic or a third graphic, the pop-up information providing information communicating a distance between the physical location of said mobile device and the physical location of the local printer associated with the engaged graphic;
  said mobile device selecting a local printer, based upon the information transmitted by said remote print service provider server, and transmitting, to said remote print service provider server, a print request, the print request including identification information corresponding to the selected local printer;
  said remote print service provider server transmitting the print request to the selected local printer, the selected local printer processing the print request.

4. The system as claimed in claim 3, wherein each local printer provides said remote print service provider server with information identifying a cost for utilizing the identified functionality;
  said mobile device displaying cost information within the pop-up information, when a user of said mobile device engages a second graphic or a third graphic.

* * * * *